(12) United States Patent
Yamamoto et al.

(10) Patent No.: US 7,163,661 B2
(45) Date of Patent: Jan. 16, 2007

(54) EXHAUST GAS PURIFYING SYSTEM

(75) Inventors: Shinji Yamamoto, Yokosuka (JP); Masahiro Takaya, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 641 days.

(21) Appl. No.: 10/172,503

(22) Filed: Jun. 17, 2002

(65) Prior Publication Data

US 2003/0012707 A1 Jan. 16, 2003

(30) Foreign Application Priority Data

| Jun. 18, 2001 | (JP) | ............................ 2001-183288 |
| May 17, 2002 | (JP) | ............................ 2002-143193 |

(51) Int. Cl.
*B01D 50/00* (2006.01)

(52) U.S. Cl. ........................ 422/177; 422/171; 422/180

(58) Field of Classification Search ................ 422/177, 422/180, 171; 60/297
See application file for complete search history.

(56) References Cited

U.S. PATENT DOCUMENTS

| 5,315,824 | A |   | 5/1994 | Takeshima |
| 5,407,880 | A |   | 4/1995 | Ikeda et al. |
| 5,529,969 | A | * | 6/1996 | Bonneau et al. ............. 502/263 |
| 5,837,642 | A | * | 11/1998 | Tanaka et al. ............... 502/304 |
| 6,047,544 | A |   | 4/2000 | Yamamoto et al. |
| 6,090,743 | A | * | 7/2000 | Chopin et al. ............... 502/302 |
| 6,113,864 | A |   | 9/2000 | Kueper et al. |
| 6,192,679 | B1 | * | 2/2001 | Nakamura et al. ............. 60/297 |
| 6,230,489 | B1 | * | 5/2001 | Tsuzuki et al. ................ 60/299 |
| 6,444,610 | B1 |   | 9/2002 | Yamamoto |
| 6,447,735 | B1 |   | 9/2002 | Yamanashi et al. |
| 6,475,453 | B1 |   | 11/2002 | Mathes et al. |
| 6,503,862 | B1 |   | 1/2003 | Yamamoto |
| 6,518,213 | B1 |   | 2/2003 | Yamamoto et al. |

FOREIGN PATENT DOCUMENTS

| EP | 0 976 916 A2 | 2/2000 |
| EP | 1 057 519 A1 | 12/2000 |
| JP | 08-006582 B2 | 5/1988 |

(Continued)

OTHER PUBLICATIONS

Yamamoto et al., "In-line Hydrocarbon (HC) Adsorber System for Reducing Cold-Start Emissions," *SAE Technical Paper Series—SAE 2000 World Congress* (Mar. 6-9, 2000), pp. 1-9, ISSN 0148-7191, Society of Automotive Engineers.

(Continued)

*Primary Examiner*—Glenn Caldarola
*Assistant Examiner*—Tom P. Duong
(74) *Attorney, Agent, or Firm*—Foley & Lardner LLP

(57) ABSTRACT

A vehicle-mounted exhaust gas purifying system includes at least a first three-way catalyst and a plurality of HC adsorbing/purifying catalysts downstream thereof on an exhaust gas passage. Each of the HC adsorbing/purifying catalysts includes a monolithic carrier having a plurality of cells, and includes HC adsorbent layer and purifying catalyst layer, which are formed on the monolithic carrier. Moreover, the number of cells per unit areas of one HC adsorbing/purifying catalysts on an upstream side is larger than the number of cells per unit areas of another HC adsorbing/purifying catalyst on a downstream side.

20 Claims, 17 Drawing Sheets

Example 42

FOREIGN PATENT DOCUMENTS

| | | |
|---|---|---|
| JP | 63-141632 U | 9/1988 |
| JP | 2-56247 | 2/1990 |
| JP | 5-59942 | 3/1993 |
| JP | 6-74019 | 3/1994 |
| JP | 6-142457 | 5/1994 |
| JP | 07-000766 A | 1/1995 |
| JP | 7-102957 | 4/1995 |
| JP | 7-144119 | 6/1995 |
| JP | 08-177474 A | 7/1996 |
| JP | 11-324662 A | 11/1999 |
| JP | 2000-008834 A | 1/2000 |
| JP | 2000-045751 A | 2/2000 |
| JP | 2000-051707 A | 2/2000 |
| JP | 2000-054832 A | 2/2000 |
| JP | 2002-129951 A | 5/2002 |
| WO | WO 97/29835 A1 | 8/1997 |

OTHER PUBLICATIONS

Patent Abstracts of Japan, vol. 2000, No. 02, Feb. 29, 2000, JP 11-324662, Nov. 26, 1999.

* cited by examiner

Table 1                                FIG.5

| Catalyst No. | β-zeolite Si/2Al | β-zeolite Amount (g/L) | Other zeolite | Si/2Al | Dopant | (g/L) | Amount of HC adsorbent layer (g/L) |
|---|---|---|---|---|---|---|---|
| 1 | 25 | 213 | — | — | — | 0 | 250 |
| 2 | 25 | 213 | — | — | — | 0 | 250 |
| 3 | 25 | 213 | — | — | — | 0 | 250 |
| 4 | 25 | 213 | — | — | — | 0 | 250 |
| 5 | 40 | 213 | — | — | — | 0 | 250 |
| 6 | 75 | 213 | — | — | — | 0 | 250 |
| 7 | 150 | 213 | — | — | — | 0 | 250 |
| 8 | 300 | 213 | — | — | — | 0 | 250 |
| 9 | 25 | 213 | — | — | — | 0 | 250 |
| 10 | 25 | 213 | — | — | — | 0 | 250 |
| 11 | 25 | 213 | — | — | — | 0 | 250 |
| 12 | 40 | 213 | — | — | — | 0 | 250 |
| 13 | 40 | 213 | — | — | — | 0 | 250 |
| 14 | 40 | 213 | — | — | — | 0 | 250 |
| 15 | 40 | 213 | — | — | — | 0 | 250 |
| 16 | 40 | 213 | — | — | — | 0 | 250 |
| 17 | 40 | 298 | — | — | — | 0 | 350 |
| 18 | 40 | 340 | — | — | — | 0 | 400 |
| 19 | 25 | 200 | Mordenite | 30 | — | 13 | 250 |
| 20 | 25 | 200 | MFI | 30 | — | 13 | 250 |
| 21 | 25 | 200 | USY | 25 | — | 13 | 250 |
| 22 | 25 | 187 | Y, MFI | 10, 30 | — | 26 | 250 |
| 23 | 25 | 200 | Ferrierite | 70 | — | 13 | 250 |
| 24 | 25 | 200 | Mordenite | 30 | Ca0.01%, Y0.01%, Zr0.1% | 13 | 250 |
| 25 | 25 | 200 | MFI | 30 | Ba0.01%, Nd0.01%, B0.01% | 13 | 250 |
| 26 | 25 | 200 | USY | 25 | Sr0.01%, La0.01% | 13 | 250 |
| 27 | 25 | 187 | Y, MFI | 10, 30 | Y: Mg0.01%, Ce0.01%, P0.1%, MFI: Ca0.01%, Nd0.01%, B0.01% | 26 | 250 |
| 28 | 25 | 200 | Ferrierite | 70 | Ag0.1%, P0.1% | 13 | 250 |
| 29 | 25 | 213 | — | — | — | 0 | 250 |
| 30 | 40 | 213 | — | — | — | 0 | 250 |
| 31 | 25 | 213 | — | — | — | 0 | 250 |
| 32 | 40 | 213 | — | — | — | 0 | 250 |
| 33 | 40 | 213 | — | — | — | 0 | 250 |
| 34 | 25 | 213 | — | — | — | — | — |
| 35 | 25 | 213 | — | — | — | — | — |
| 36 | 25 | 213 | — | — | — | — | — |
| 37 | — | — | MFI | 30 | — | 213 | 250 |
| 38 | — | — | USY+MFI | 25, 30 | — | 107, 107 | 250 |
| 39 | — | — | Mordenite | 30 | Ag30%, P5% | 213 | 250 |
| 40 | — | — | — | — | — | — | — |
| 41 | — | — | — | — | — | — | — |
| 42 | 25 | 213 | — | — | — | 0 | 250 |

FIG.6

Table 2

| Catalyst No. | Pt (g/L) | Pd (g/L) | Rh (g/L) | BaO (g/L) | Crystallite size of $CeO_2$ doped in almina (Å) | Ceria materials | Numbers of cells (cpsi) | Thickness of wall (mill) |
|---|---|---|---|---|---|---|---|---|
| 1 | 0.71 | 1.88 | 0.24 | 4.0 | 81 (Fig.3) | La0.01Zr0.32Ce0.67O2 | 200 | 10 |
| 2 | 0.71 | 1.88 | 0.24 | 4.0 | 81 | Pr0.3Ce0.7O2 | 200 | 10 |
| 3 | 0.71 | 1.88 | 0.24 | 4.0 | 50 (Fig.4) | La0.01Zr0.32Ce0.67O2 | 200 | 10 |
| 4 | 0.71 | 1.88 | 0.24 | 4.0 | 50 | Pr0.3Ce0.7O2 | 200 | 10 |
| 5 | 0.71 | 1.88 | 0.24 | 4.0 | 81 | La0.01Zr0.32Ce0.67O2 | 200 | 10 |
| 6 | 0.71 | 1.88 | 0.24 | 4.0 | 80 | La0.01Zr0.32Ce0.67O2 | 200 | 10 |
| 7 | 0.71 | 1.88 | 0.24 | 4.0 | 80 | La0.01Zr0.32Ce0.67O2 | 200 | 10 |
| 8 | 0.71 | 1.88 | 0.24 | 4.0 | 80 | La0.01Zr0.32Ce0.67O2 | 200 | 10 |
| 9 | 0.71 | 1.88 | 0.24 | 4.0 | 80 | La0.01Zr0.32Ce0.67O3 | 300 | 6 |
| 10 | 0.71 | 1.88 | 0.24 | 4.0 | 80 | La0.01Zr0.32Ce0.67O2 | 400 | 4 |
| 11 | 0.71 | 1.88 | 0.24 | 4.0 | 80 | La0.01Zr0.32Ce0.67O2 | 600 | 2 |
| 12 | 0.36 | 0.94 | 0.12 | 4.0 | 80 | La0.01Zr0.32Ce0.67O2 | 200 | 10 |
| 13 | 0.36 | 0.94 | 0.12 | 4.0 | 80 | La0.01Zr0.32Ce0.67O3 | 300 | 6 |
| 14 | 0.36 | 0.94 | 0.12 | 4.0 | 80 | La0.01Zr0.32Ce0.67O2 | 400 | 4 |
| 15 | 0.36 | 0.94 | 0.12 | 4.0 | 80 | La0.01Zr0.32Ce0.67O2 | 600 | 2 |
| 16 | 0.36 | 0.94 | 0.12 | 4.0 | 80 | La0.01Zr0.32Ce0.67O2 | 300 | 6 |
| 17 | 0.36 | 0.94 | 0.12 | 4.0 | 80 | La0.01Zr0.32Ce0.67O2 | 300 | 6 |
| 18 | 0.36 | 0.94 | 0.12 | 4.0 | 80 | La0.01Zr0.32Ce0.67O2 | 300 | 6 |
| 19 | 0.36 | 0.94 | 0.12 | 4.0 | 47 (Fig.5) | La0.01Zr0.32Ce0.67O2 | 300 | 6 |
| 20 | 0.36 | 0.94 | 0.12 | 4.0 | 85 | La0.01Zr0.32Ce0.67O2 | 300 | 6 |
| 21 | 0.71 | 1.88 | 0.24 | 4.0 | 82 | La0.01Zr0.32Ce0.67O2 | 200 | 10 |
| 22 | 0.71 | 1.88 | 0.24 | 4.0 | 81 | La0.01Zr0.32Ce0.67O2 | 300 | 6 |
| 23 | 0.36 | 0.94 | 0.12 | 4.0 | 81 | La0.01Zr0.32Ce0.67O2 | 300 | 6 |
| 24 | 0.36 | 0.94 | 0.12 | 4.0 | 81 | La0.01Zr0.32Ce0.67O2 | 300 | 6 |
| 25 | 0.36 | 0.94 | 0.12 | 4.0 | 81 | Zr0.05Pr0.25Ce0.7O2 | 300 | 6 |
| 26 | 0.36 | 0.94 | 0.12 | 4.0 | 81 | La0.01Zr0.32Ce0.67O2 | 300 | 6 |
| 27 | 0.71 | 1.88 | 0.24 | 4.0 | 81 | La0.01Zr0.32Ce0.67O2 | 200 | 10 |
| 28 | 0.71 | 1.88 | 0.24 | 4.0 | 50 | Pr0.3Ce0.7O2 | 200 | 10 |
| 29 | 0.36 | 0.94 | 0.12 | 4.0 | 49 | La0.01Zr0.32Ce0.67O2 | 300 | 6 |
| 30 | 0.36 | 0.94 | 0.12 | 4.0 | 49 | La0.01Zr0.32Ce0.67O2 | 300 | 6 |
| 31 | 0.36 | 0.94 | 0.12 | 4.0 | 81 | Pr0.35Ce0.65O2 | 300 | 6 |
| 32 | 0.36 | 0.94 | 0.12 | 4.0 | 80 | La0.01Zr0.05Pr0.24Ce0.7O2 | 300 | 6 |
| 33 | 0.36 | 0.94 | 0.12 | 4.0 | 45 | La0.01Nd0.01Pr0.28Ce0.7O2 | 300 | 6 |
| 34 | 0.71 | 1.88 | 0.24 | 4.0 | 81 | Pr0.8Ce0.2O2 | 200 | 10 |
| 35 | 0.71 | 1.88 | 0.24 | 4.0 | 150 | La0.01Zr0.32Ce0.67O2 | 200 | 10 |
| 36 | 0.71 | 1.88 | 0.24 | 4.0 | 81 | La0.01Zr0.32Ce0.67O2 | 900 | 2 |
| 37 | 0.36 | 0.94 | 0.12 | 4.0 | 81 | La0.01Zr0.32Ce0.67O2 | 300 | 6 |
| 38 | 0.36 | 0.94 | 0.12 | 4.0 | 81 | La0.01Zr0.32Ce0.67O2 | 300 | 6 |
| 39 | 0.36 | 0.94 | 0.12 | 4.0 | 81 | La0.01Zr0.32Ce0.67O2 | 300 | 6 |
| 40 | — | 1.18 | 0.24 | — | 81 | La0.01Zr0.32Ce0.67O3 | 900 | 2 |
| 41 | 0.71 | 2.36 | 0.24 | 4.0 | 81 | La0.01Zr0.32Ce0.67O4 | 1200 | 2 |
| 42 | 0.71 | 1.88 | 0.24 | 4.0 | 81 | La0.01Zr0.32Ce0.67O2 | 200 | 10 |

XRD property

| Miller index | Diffraction angle (2θ) | Relative intensity |
|---|---|---|
| (111) | 28.56 | 1.00 |
| (200) | 33.08 | 0.44 |
| (220) | 47.81 | 0.31 |
| (311) | 56.39 | 0.32 |
| (222) | 59.88 | 0.08 |
| (400) | 69.09 | 0.03 |
| (311) | 77.01 | 0.12 |
| (420) | 79.29 | 0.07 |

XRD property

| Miller index | Diffraction angle (2θ) | Relative intensity |
|---|---|---|
| (111) | 28.47 | 1.00 |
| (200) | 32.63 | 0.97 |
| (220) | 48.48 | 0.02 |
| (311) | 56.30 | 0.49 |
| (222) | 60.79 | 0.30 |
| (400) | 68.96 | 0.08 |
| (311) | 76.94 | 0.16 |
| (420) | 79.08 | 0.10 |

Examples 1~34, 46~60
61~64

( ): Volume

Examples 35~40

( ): Volume

Example 41

Example 42

Example 43

Example 44

Example 45

Table 3            FIG.11

| Examples | 1st 3-way catalyst :21 Catalyst No. | 1st HC catalyst :11 Catalyst No. | 2nd HC catalyst :12 Catalyst No. | 2nd 3-way catalyst :22 Catalyst No. | 1st HC catalyst :11 HC absorption rate (%) | 2nd HC catalyst :12 HC absorption rate (%) | Total HC catalysts HC absorption rate (%) | HC purification rate (%) | A-bag (mg/mile) |
|---|---|---|---|---|---|---|---|---|---|
| 1 | 41 | 13 | 1 | 40 | 52 | 28 | 80 | 63 | 7.4 |
| 2 | 41 | 13 | 2 | 40 | 52 | 28 | 80 | 64 | 7.3 |
| 3 | 41 | 13 | 3 | 40 | 52 | 28 | 80 | 63 | 7.4 |
| 4 | 41 | 13 | 4 | 40 | 52 | 28 | 80 | 63 | 7.4 |
| 5 | 41 | 13 | 5 | 40 | 54 | 28 | 82 | 64 | 7.3 |
| 6 | 41 | 13 | 6 | 40 | 55 | 29 | 84 | 63 | 7.4 |
| 7 | 41 | 13 | 7 | 40 | 56 | 28 | 84 | 63 | 7.4 |
| 8 | 41 | 13 | 8 | 40 | 58 | 28 | 86 | 63 | 7.4 |
| 9 | 41 | 13 | 9 | 40 | 52 | 35 | 87 | 63 | 7.4 |
| 10 | 41 | 12 | 1 | 40 | 50 | 25 | 75 | 63 | 7.4 |
| 11 | 41 | 14 | 10 | 40 | 55 | 27 | 82 | 64 | 7.3 |
| 11 | 41 | 15 | 11 | 40 | 60 | 30 | 90 | 65 | 7.2 |
| 12 | 41 | 16 | 1 | 40 | 52 | 28 | 80 | 67 | 7.0 |
| 13 | 41 | 17 | 1 | 40 | 57 | 28 | 85 | 70 | 6.7 |
| 14 | 41 | 18 | 1 | 40 | 59 | 28 | 87 | 72 | 6.5 |
| 15 | 41 | 19 | 1 | 40 | 53 | 28 | 81 | 63 | 7.4 |
| 16 | 41 | 20 | 1 | 40 | 54 | 28 | 82 | 64 | 7.3 |
| 17 | 41 | 13 | 21 | 40 | 52 | 29 | 81 | 63 | 7.4 |
| 18 | 41 | 13 | 22 | 40 | 52 | 30 | 82 | 63 | 7.4 |
| 19 | 41 | 13 | 27 | 40 | 52 | 30 | 82 | 63 | 7.4 |
| 20 | 41 | 13 | 28 | 40 | 52 | 31 | 83 | 64 | 7.3 |
| 21 | 41 | 23 | 1 | 40 | 54 | 28 | 82 | 63 | 7.4 |
| 22 | 41 | 24 | 1 | 40 | 55 | 28 | 83 | 64 | 7.3 |
| 23 | 41 | 25 | 1 | 40 | 55 | 28 | 83 | 63 | 7.4 |
| 24 | 41 | 26 | 1 | 40 | 56 | 29 | 85 | 64 | 7.3 |
| 25 | 41 | 24 | 27 | 40 | 55 | 30 | 85 | 63 | 7.4 |
| 26 | 41 | 25 | 28 | 40 | 56 | 31 | 87 | 64 | 7.3 |
| 27 | 41 | 27 | 28 | 40 | 55 | 31 | 86 | 64 | 7.3 |
| 28 | 41 | 1 | 1 | 40 | 45 | 29 | 74 | 66 | 7.1 |
| 29 | 41 | 9 | 9 | 40 | 52 | 35 | 87 | 65 | 7.2 |
| 30 | 41 | 29 | 4 | 40 | 52 | 28 | 80 | 70 | 6.7 |
| 31 | 41 | 30 | 4 | 40 | 53 | 28 | 81 | 73 | 6.4 |
| 32 | 41 | 31 | 4 | 40 | 52 | 29 | 81 | 75 | 6.2 |
| 33 | 41 | 32 | 4 | 40 | 51 | 28 | 79 | 73 | 6.4 |
| 34 | 41 | 33 | 4 | 40 | 50 | 29 | 79 | 74 | 6.3 |
| 61 | 41 | 14 | 1 | 40 | 55 | 28 | 83 | 68 | 6.7 |
| 62 | 41 | 15 | 1 | 40 | 60 | 30 | 90 | 70 | 6.6 |
| 63 | 41 | 14 | 13 | 40 | 55 | 29 | 84 | 70 | 6.7 |
| 64 | 41 | 15 | 13 | 40 | 60 | 31 | 91 | 72 | 6.6 |

※HC catalyst : HC adsorbing/purifying catalyst

FIG.12

Table 4

| Examples | 1st 3-way catalyst :21 Catalyst No. | 1st HC catalyst :11 Catalyst No. | 2nd HC catalyst :12 Catalyst No. | 3rd HC catalyst :13 Catalyst No. | 2nd 3-way catalyst :22 Catalyst No. | 1st HC catalyst :11 HC absorption rate (%) | 2nd HC catalyst :12 HC absorption rate (%) | 3rd HC catalyst :13 HC absorption rate (%) | Total HC catalysts HC absorption rate (%) | HC purification rate (%) | A-bag (mg/mile) |
|---|---|---|---|---|---|---|---|---|---|---|---|
| 35 | 41 | 13 | 1 | 1 | 40 | 52 | 28 | 15 | 95 | 74 | 5.6 |
| 36 | 41 | 13 | 1 | 2 | 40 | 52 | 28 | 17 | 97 | 73 | 5.7 |
| 37 | 41 | 1  | 1 | 4 | 40 | 45 | 29 | 16 | 90 | 75 | 5.5 |
| 38 | 41 | 29 | 1 | 4 | 40 | 52 | 28 | 15 | 95 | 76 | 5.5 |
| 39 | 41 | 33 | 1 | 4 | 40 | 50 | 27 | 16 | 93 | 75 | 5.5 |
| 40 | 41 | 13 | 1 | 4 | 40 | 52 | 28 | 15 | 95 | 74 | 5.6 |

FIG.13

Table 5

| Example | 1st 3-way catalyst :21 Catalyst No. | 1st HC catalyst :11 Catalyst No. | 2nd HC catalyst :12 Catalyst No. | 3rd 3-way catalyst :23 Catalyst No. | 3rd HC catalyst :13 Catalyst No. | 2nd 3-way catalyst :22 Catalyst No. | 1st HC catalyst :11 HC absorption rate (%) | 2nd HC catalyst :12 HC absorption rate (%) | 3rd HC catalyst :13 HC absorption rate (%) | Total HC catalysts HC absorption rate (%) | HC purification rate (%) | A-bag (mg/mile) |
|---|---|---|---|---|---|---|---|---|---|---|---|---|
| 41 | 41 | 13 | 1 | 40 | 1 | 40 | 52 | 28 | 17 | 97 | 78 | 5.5 |
| 42 | 41 | 13 | 40 | 1 | 4 | 40 | 52 | 30 | 15 | 97 | 80 | 5.4 |
| 43 | 41 | 13 | 42 | — | — | 40 | 52 | 28 | — | 80 | 72 | 5.7 |
| 44 | 41 | 13 | 42 | — | 42 | 40 | 52 | 28 | — | 80 | 78 | 5.5 |
| 45 | 41 | 13 | 42 | 40 | 42 | 40 | 52 | 30 | 15 | 97 | 82 | 5.3 |

FIG.14

Table 6

| Examples | 1st 3-way catalyst : 21 Catalyst No. | 1st HC catalyst : 11 Catalyst No. | 2nd HC catalyst : 12 Catalyst No. | 2nd 3-way catalyst : 22 Catalyst No. | 1st HC catalyst : 11 HC absorption rate (%) | 2nd HC catalyst : 12 HC absorption rate (%) | Total HC catalysts HC absorption rate (%) | HC purification rate (%) | A-bag (mg/mile) |
|---|---|---|---|---|---|---|---|---|---|
| 46 | 41 | 13 | 34 | 40 | 52 | 28 | 80 | 35 | 13.3 |
| 47 | 41 | 13 | 35 | 40 | 52 | 28 | 80 | 30 | 15.5 |
| 48 | 41 | 13 | 36 | 40 | 52 | 40 | 92 | 35 | 13.3 |
| 49 | 41 | 13 | 10 | 40 | 52 | 35 | 87 | 35 | 13.3 |
| 50 | 41 | 13 | 11 | 40 | 52 | 32 | 84 | 35 | 13.3 |
| 51 | 41 | 12 | 11 | 40 | 50 | 32 | 82 | 35 | 13.3 |
| 52 | 41 | 12 | 36 | 40 | 50 | 40 | 90 | 35 | 13.3 |
| 53 | 41 | 37 | 1 | 40 | 30 | 28 | 58 | 28 | 16.7 |
| 54 | 41 | 38 | 1 | 40 | 35 | 28 | 63 | 29 | 16.1 |
| 55 | 41 | 39 | 1 | 40 | 35 | 28 | 63 | 28 | 16.7 |
| 56 | 41 | 40 | 39 | 40 | 0 | 0 | 0 | 0 | 24.4 |
| 57 | 41 | 37 | 34 | 40 | 30 | 28 | 58 | 21 | 22.2 |
| 58 | 41 | 38 | 35 | 40 | 35 | 28 | 63 | 23 | 20.3 |
| 59 | 41 | 39 | 36 | 40 | 35 | 28 | 63 | 25 | 18.6 |
| 60 | 41 | 39 | 35 | 40 | 35 | 16 | 51 | 25 | 18.6 |

EXHAUST GAS PURIFYING SYSTEM

BACKGROUND OF THE INVENTION

1. Field of the Invention

The present invention relates to an exhaust gas purifying system. More particularly, the present invention relates to an exhaust gas purifying system capable of effectively purifying a large amount of hydrocarbons (HC) discharged from a vehicle at a low temperature at time of starting up an engine.

2. Description of the Related Art

Heretofore, in order to purify exhaust gas from an internal combustion engine of an automobile or the like, a three-way catalyst that simultaneously performs oxidation of carbon monoxide (CO) and hydrocarbons (HC) and reduction of nitrogen oxides (NOx) has widely been used. However, at a low temperature at time of starting up the engine, the three-way catalyst is not activated because of the low temperature, and thus a large amount of cold HC discharged in this case cannot be purified.

Recent years, for the purpose of purifying such cold HC, a HC adsorbing/purifying catalyst (three-way catalyst having a HC adsorbing function) has been developed, which includes zeolite as a hydrocarbon adsorbent (HC adsorbent) and a purifying catalyst such as a three-way catalyst.

The HC adsorbing/purifying catalyst temporarily adsorbs and holds cold HC discharged in a low temperature range at the time of starting up the engine, in which the three-way catalyst is not activated. Then, the HC adsorbing/purifying catalyst gradually desorbs and even purifies the HC when the three-way catalyst is activated due to a temperature increase of the exhaust gas.

As the catalyst purifying the HC desorbed from the HC adsorbent, a catalyst obtained by mixing noble metals such as rhodium (Rh), platinum (Pt) and palladium (Pd) on the same layer and a catalyst of a multilayer structure including Rh and Pd layers have been proposed. Japanese Patent Laid-Open Publication H2-56247 (published in 1990) discloses an exhaust gas purifying catalyst including a first layer containing zeolite and a second layer on the first layer. The second layer mainly contains noble metals such as Pt, Pd and Rh.

Other three-way catalysts combined with HC adsorbents have been disclosed in Japanese Patent Laid-Open Publications H6-74019 (published in 1994), H7-144119 (published in 1995), H6-142457 (published in 1994), H5-59942 (published in 1993) and H7-102957 (published in 1995).

SUMMARY OF THE INVENTION

However, in the case of using the conventional HC adsorbing/purifying catalyst, the cold HC adsorbed to the HC adsorbent at the time of starting up the engine may sometimes be desorbed before an exhaust gas reaches a sufficient high temperature. Such early desorbed HC is discharged in an unpurified state because of insufficient activation of the three-way catalyst.

For solving the above problem, the following purifying methods have been studied. In one purifying method, a switching an exhaust passage controls adsorbed HC to desorb after the three-way catalyst is sufficiently activated. In another purifying method, an electric heater raises the temperature of a three-way catalyst and accelerates an activation of the three-way catalyst. In the other purifying method, introducing external air accelerates an activation of the three-way catalyst.

However, these methods are costly because of complex system configurations, and purification rate of the cold HC cannot be sufficiently increased.

Moreover, studies have been conducted on a method of improving purification rate of HC by providing a plurality of the same HC adsorbing/purifying catalysts on an exhaust gas passage. However, a space in a vehicle is limited, which is capable of having HC adsorbing/purifying catalysts mounted therein, leading to limitations on the number of increasable HC adsorbing/purifying catalysts. Particularly, in an engine room, there is hardly any space for adding more catalysts. Generally, since a HC adsorbing/purifying catalyst disposed on an upstream side cannot obtain a sufficient HC purification rate of a HC adsorbing/purifying catalyst disposed on a downstream side, a load is apt to be applied to a HC adsorbing/purifying catalyst disposed on a downstream side. Accordingly, even if the number of the same HC adsorbing/purifying catalysts is simply increased, the HC purification rate cannot be improved efficiently.

An object of the present invention is to provide a simple exhaust gas purifying system capable of improving the purification rate of the cold HC.

An exhaust gas purifying system according to an aspect of the present invention includes a first three-way catalyst disposed on an exhaust gas passage, and a plurality of HC adsorbing/purifying catalysts disposed downstream thereof. Each of the HC adsorbing/purifying catalysts includes a monolithic carrier having a plurality of cells, and HC adsorbent layer and HC purifying catalyst layer, which are formed on the monolithic carrier. Moreover, the numbers of cells per unit areas of one HC adsorbing/purifying catalysts located on the upstream side is larger than the numbers of cells per unit areas of another HC adsorbing/purifying catalysts located more downstream. Note that the "unit area" used here means a unit area of a section perpendicular to an exhaust gas flow direction.

BRIEF DESCRIPTION OF THE DRAWINGS

FIGS. 5 and 6 are tables showing conditions of catalysts used in exhaust gas purifying systems according to examples.

Figure 10A:
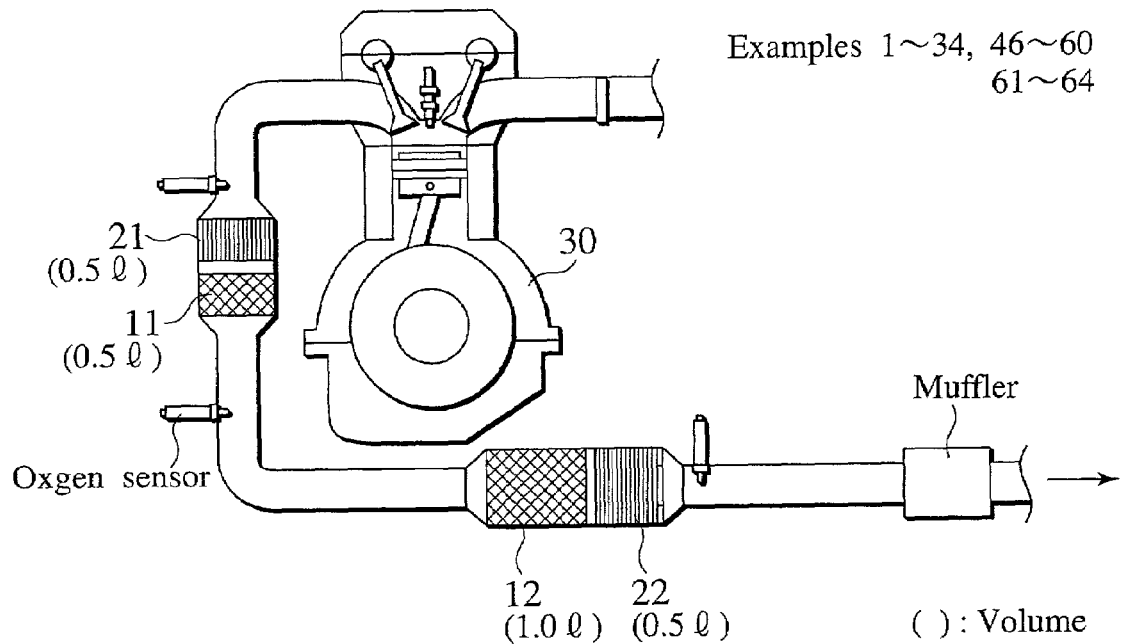
Figure 10B:
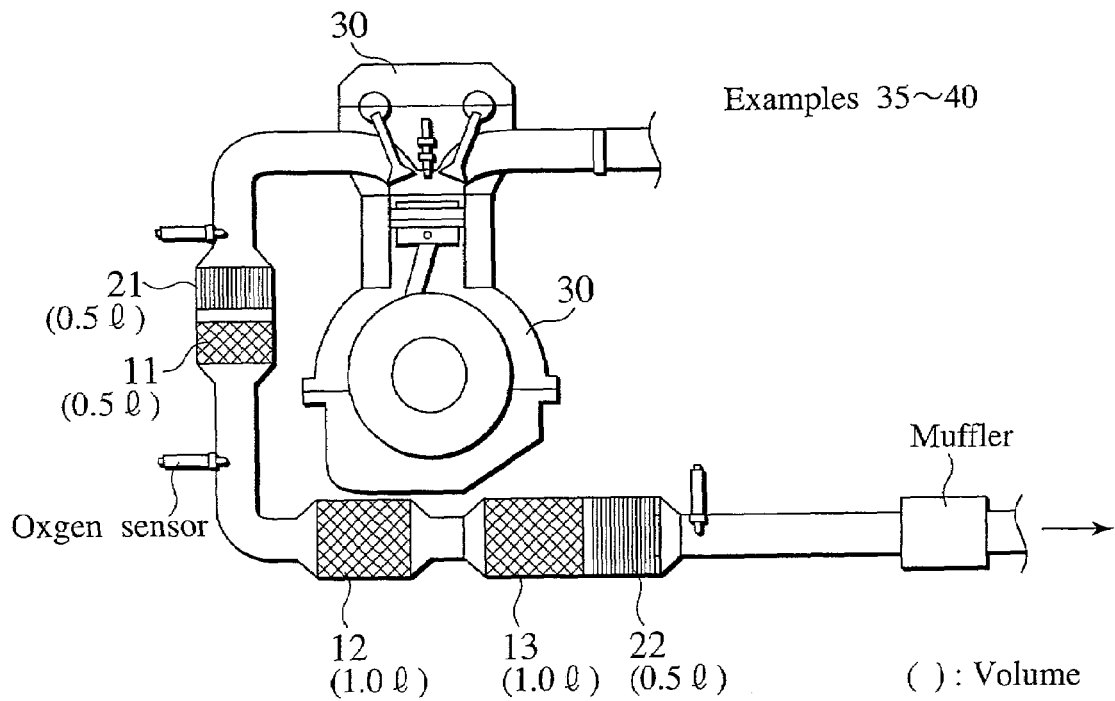

FIG. 10A is a view of a configuration of an exhaust gas purifying system used in Examples 1 to 34 and 61 to 64; FIG. 10B is a view of a configuration of an exhaust gas purifying system used in Examples 35 to 40; and FIGS. 10C to 10G are views of configurations of exhaust gas purifying systems used in Examples 41 to 45, respectively.

FIG. 11 is Table 3 showing kinds and properties of catalysts used in Examples 1 to 34 and 61 to 64.

FIG. 12 is Table 4 showing kinds and properties of catalysts used in Examples 35 to 40.

FIG. 13 is Table 5 showing kinds and properties of catalysts used in Examples 41 to 45.

FIG. 14 is Table 6 showing kinds and properties of catalysts used in Examples 46 to 60.

DESCRIPTION OF THE PREFERRED EMBODIMENTS

Hereinafter, description will be made for an exhaust gas purifying system according to an embodiment of the present invention. In the present specification, "%" represents a mass percentage unless otherwise specified.

Figure 1:
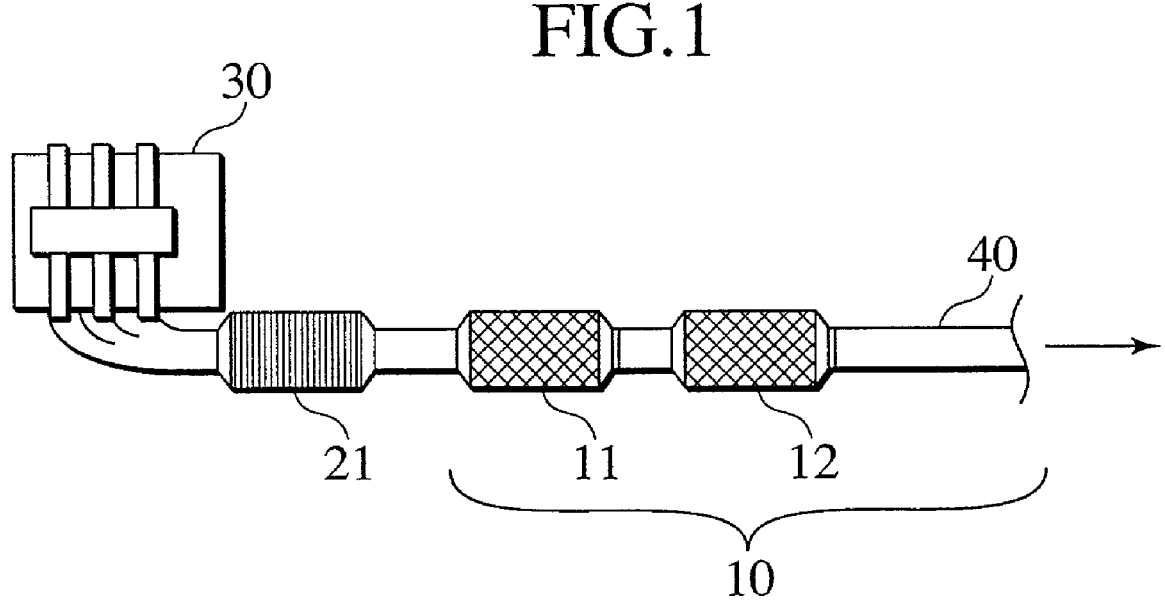
FIG. 1 is a view of a basic configuration of an exhaust gas purifying system according to an embodiment of the present invention.
Figure 2A:
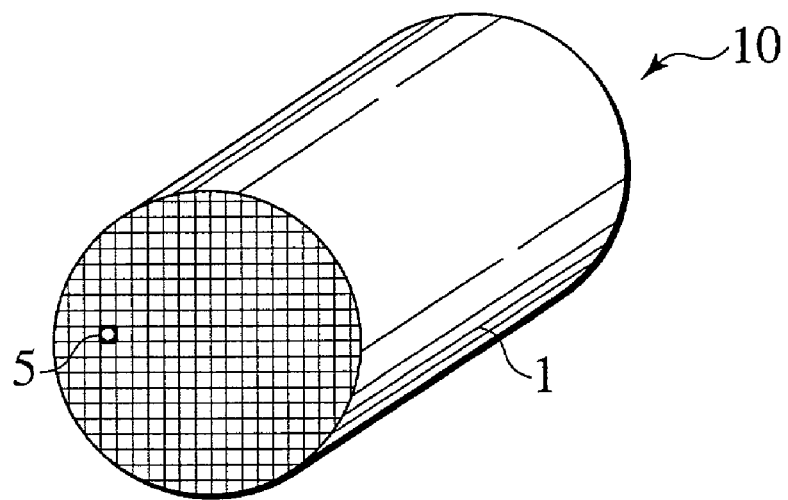
FIGS. 2A and 2B are a perspective view of a HC adsorbing/purifying catalyst and an enlarged sectional view of a cell according to the embodiment of the present invention, respectively.
Figure 2B:
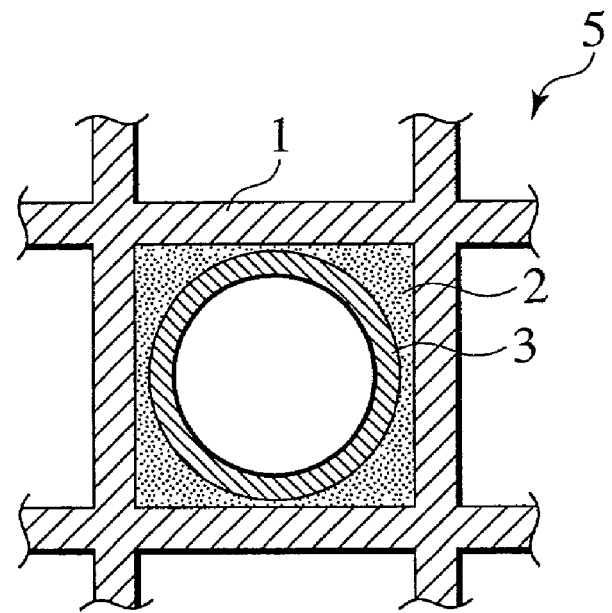

As shown in FIG. 1A, the exhaust gas purifying system of this embodiment includes a HC adsorbing/purifying catalysts group 10 disposed on a passage 40 for exhaust gas discharged from an internal combustion engine 30, and a first three-way catalyst 21 disposed upstream thereof. The HC adsorbing/purifying catalysts group 10 is consist of at least two or more HC adsorbing/purifying catalysts 11, 12 . . . 1n disposed at least in series on the passage 40. As shown in FIGS. 2A and 2B, each of the HC adsorbing/purifying catalysts includes a monolithic carrier 1 having a plurality of cells 5, and includes HC adsorbent layers 2 and purifying catalyst layers 3, which are formed on the monolithic carrier 1.

Figure 3A:
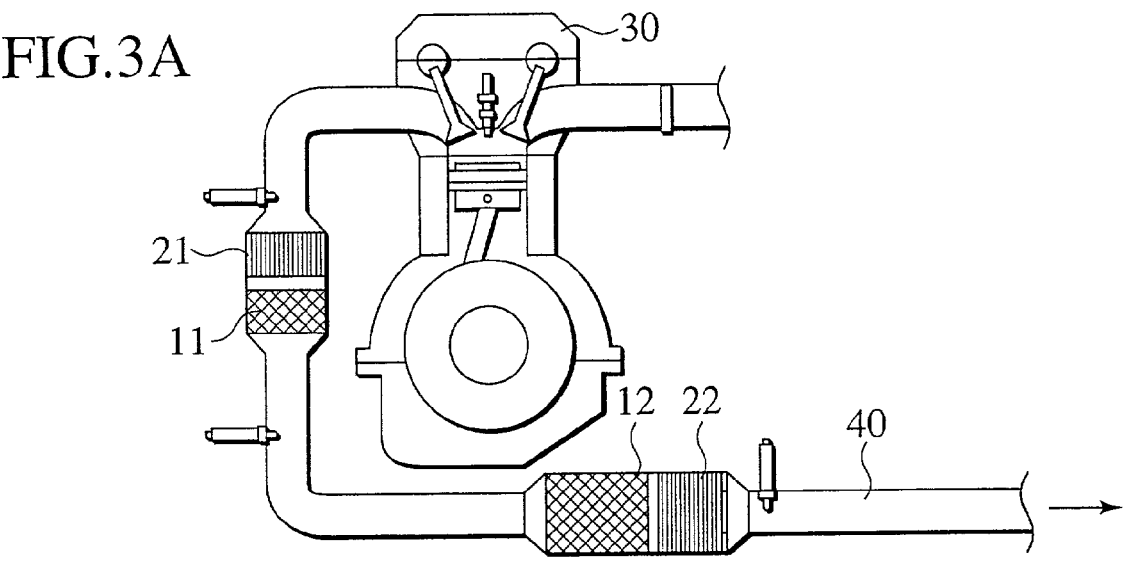
FIGS. 3A to 3C are views of exhaust gas purifying systems of other aspects according to the embodiment of the present invention.
Figure 3B:
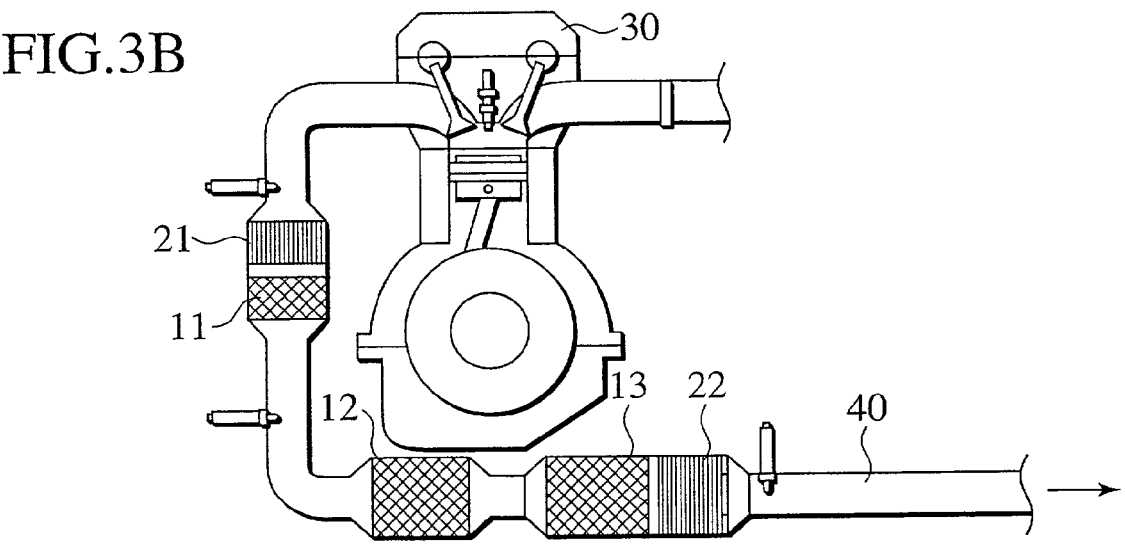
Figure 3C:
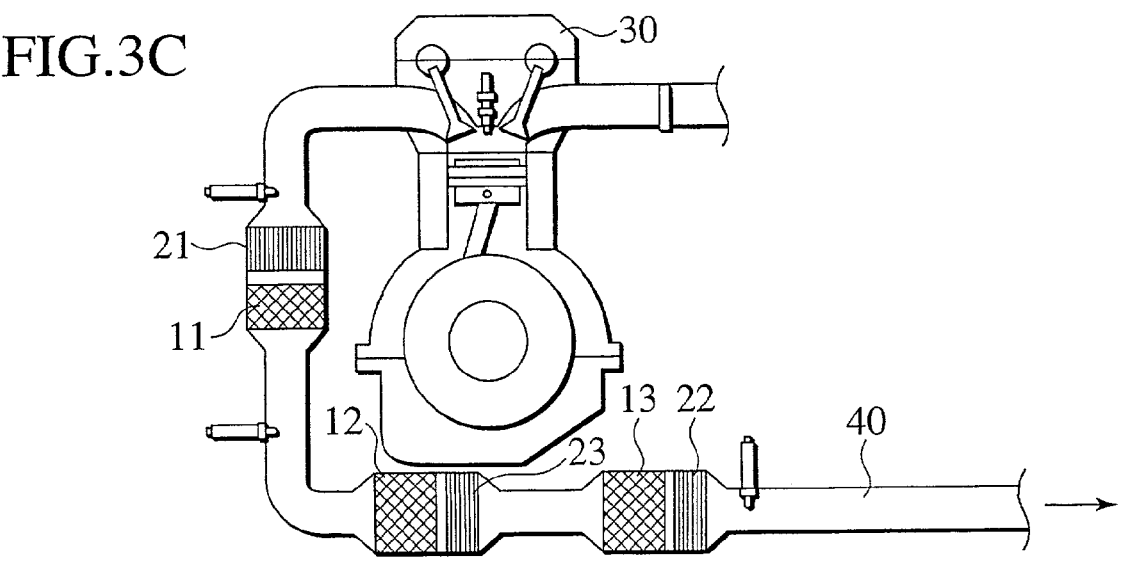
Figure 4:
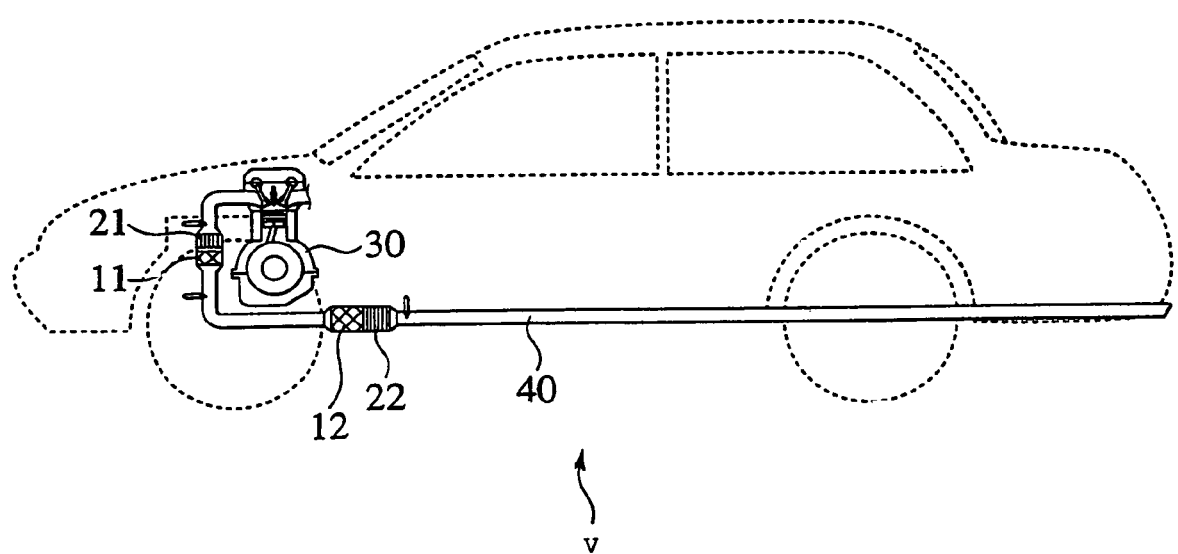
FIG. 4 is a view showing an example of a vehicle-mounted exhaust gas purifying system according to the embodiment of the present invention.

Note that FIGS. 3A to 3C are views of other aspects of vehicle-mounted exhaust gas purifying systems according to the embodiment of the present invention. FIG. 4 is a view showing a state of the exhaust gas purifying system shown in FIG. 3A, which is mounted on a vehicle. As shown in this drawing, the first three-way catalyst 21 and the first HC adsorbing/purifying catalyst 11 are generally disposed in an engine room.

As shown in FIG. 3A, a second three-way catalyst 22 may be added downstream of the HC adsorbing/purifying catalyst group 10 that consists of the HC adsorbing/purifying catalysts 11 and 12. Moreover, as shown in FIG. 3B, in the vehicle-mounted exhaust gas purifying system according to this embodiment, the HC adsorbing/purifying catalyst group 10 may include three or more HC adsorbing/purifying catalysts 11, 12 and 13 disposed in series. Furthermore, as shown in FIG. 3C, the vehicle-mounted exhaust gas purifying system according to this embodiment may include a third three-way catalyst 23 between the HC adsorbing/purifying catalyst 12 and the HC adsorbing/purifying catalyst 13.

A feature of the HC adsorbing/purifying catalyst group 10 of the exhaust gas purifying system according to this embodiment is that the numbers of cells per unit areas of the HC adsorbing/purifying catalysts disposed on the upstream side are larger than the numbers of cells per unit areas of the HC adsorbing/purifying catalysts disposed on the downstream side. For example, as shown in FIG. 1A, when two pieces of the HC adsorbing/purifying catalysts 11 and 12 are provided, the number of cells N11 of the HC adsorbing/purifying catalyst 11 disposed on the upstream side is larger than the number of cells N12 of the HC adsorbing/purifying catalyst 12. Specifically, these numbers satisfy the following equation:

$$N11 > N12$$

Moreover, when the HC adsorbing/purifying catalyst group 10 includes N pieces of the HC adsorbing/purifying catalysts, if the HC adsorbing/purifying catalysts are called a fist, a second, a third . . . an N-th HC adsorbing/purifying catalysts in order from the upstream side, and the numbers of cells per unit areas of the respective HC adsorbing/purifying catalysts are defined as $N11, N12, N13 \ldots N1n$, then these numbers satisfy the following equation:

$$N11 > N12 \geq N13 \geq \ldots > N1n$$

In order to increase a HC purification rate, which can be called "a HC desorption-purification rate", the HC adsorbing/purifying catalyst, it is desirable to delay a desorption rate as well as to increase an adsorption amount to the HC adsorbing/purifying catalyst. Specifically, if it is possible to match timing when HC are desorbed from the HC adsorbent layer 2 and timing when the purifying catalyst layer 3 is activated, a high HC purification rate can be obtained. Moreover, it is desirable to adsorb again desorbed HC. The HC are desorbed before the purifying catalyst layer is activated and unpurified.

A temperature of an exhaust gas on the upstream side close to the internal combustion engine is high and becomes low on the downstream side. On the upstream side, since the exhaust gas that has the high temperature and high density of a HC is brought into contact with the HC adsorbing/purifying catalyst, desorption of HC is promoted. Therefore, the adsorption rate of HC is accelerated, and an effective HC purification rate is lowered. Accordingly, when a plurality of HC adsorbing/purifying catalysts of the same type are arrayed in series, the HC adsorption rate of the HC adsorbing/purifying catalyst on the upstream side is lower than that of the HC adsorbing/purifying catalyst on the downstream side. Consequently, an effective HC adsorption amount of the HC adsorbing/purifying catalyst on the downstream side is close to a saturated adsorption amount. When the HC adsorption amount is sufficiently lower than the saturated adsorption amount, unpurified HC that are early desorbed can be adsorbed again and purified. However, when the HC adsorption amount is large, since the unpurified HC that are desorbed are difficult to be adsorbed again, it is difficult to improve the HC purification rate.

In the exhaust gas purifying system according to this embodiment, the numbers of cells per unit areas of the HC adsorbing/purifying catalysts on the upstream side is larger than the numbers of cells per unit areas of the HC adsorbing/purifying catalysts on the downstream side. As the number of cells per unit area is larger, a contact area of the exhaust gas and the HC adsorbing/purifying catalyst is increased more. Therefore, the adsorption rate of the HC adsorbing/purifying catalyst on the upstream side can be improved. Accordingly, the amount of HC adsorbed to the HC adsorbing/purifying catalyst on the upstream side is increased, and thus a load to the HC adsorbing/purifying catalyst on the downstream side is reduced. Consequently, with regard to the HC adsorbing/purifying catalyst on the downstream side, an actual HC adsorption amount is reduced more than the HC saturated adsorption amount. Therefore, since the HC that are desorbed as they remain unpurified can be adsorbed again, the purification rate of HC can be improved.

Although increasing volumes of HC adsorbing/purifying catalysts on the upstream side can increase the HC adsorption amount thereof, it is difficult to increase the volume since a space in a vehicle V is limited. Particularly, as shown in FIG. 4, no extra space is provided in the engine room where the first HC adsorbing/purifying catalyst 11 is disposed. Accordingly, the use of a monolithic carrier having a large number of cells per unit area for the first HC adsorbing/purifying catalyst is suitable for the vehicle-mounted exhaust gas purifying system because the HC adsorption amount can be increased without changing the volume of the catalyst.

For example, the number of cells N11 per unit area of the first HC adsorbing/purifying catalyst 11 disposed most upstream is set in a range of 1.5 to 3 times the number of cells N12 per unit area of the second HC adsorbing/purifying catalyst 12, preferably in a range of 1.5 to 2 times. For example, when the number of cells of the second HC adsorbing/purifying catalyst 12 is 200 cpsi, the number of cells of the first HC adsorbing/purifying catalyst 11 is set in a range of 300 to 600 cpsi.

Until the first three-way catalyst become to be activated, the number of cells can be controlled such that the first HC adsorbing/purifying catalyst 11 adsorb 50% or more of cold HC discharged.

In addition to the control by the number of cells, the control of the hydrocarbon adsorbent amount is effective. If a hydrocarbon adsorbent amount of the upstream HC adsorbing/purifying catalyst is controlled to be larger than an amount of the hydrocarbon adsorbent of the downstream HC adsorbing/purifying catalyst, the HC adsorption amount of the upstream HC adsorbing/purifying catalyst can be increased more effectively.

Note that, similarly to the HC adsorbing/purifying catalyst, the first three-way catalyst 21 may be also formed on a monolithic carrier having a plurality of cells. It is preferable that the first three-way catalyst 21 has a function of reducing a total amount of cold HC adsorbed to the HC adsorbing/purifying catalyst group 10, which is a sum of the HC adsorption amounts of the respective catalysts. Preferably the total amount of cold HC adsorbed to the HC adsorbing/purifying catalyst group 10 is set to less than a total saturated adsorption amount of HC of the HC adsorbing/purifying catalyst group 10, which is a sum of the saturated adsorption amounts of the respective catalysts, representatively, is set to 70% or less of the total saturated adsorption amount.

When the first three-way catalyst 21 controls the adsorption amount of the HC adsorbing/purifying catalyst group 10 as described above, it is made possible to effectively adsorb again the unpurified and desorbed HC to different positions of the HC adsorbent layer. Therefore, the purification rate of HC can be improved.

Moreover, in order to control the amount of cold HC flown into the HC adsorbing/purifying catalyst to be 70% or less of the saturated adsorption amount, it is preferable to accelerate the activation of the first three-way catalyst 21 located upstream. In order to accelerate the activation of the three-way catalyst, it is preferable to increase a contact frequency of the three-way catalyst layer and the exhaust gas, to transmit heat from the exhaust gas to the three-way catalyst layer efficiently, and thus to accelerate a temperature rise of the three-way catalyst. For this purpose, it is desirable to use a support having a large number of cells.

Meanwhile, in each HC adsorbing/purifying catalyst of the HC adsorbing/purifying catalyst group 10, since a too large number of cells per unit area result in reduction of the cells in size, it becomes difficult to coat the HC adsorbent layer 2 to be thick. If the HC adsorbent layer 2 is thin, since the desorption of HC is accelerated, it becomes difficult to increase the HC purification rate. Accordingly, it is desirable that the number of cells of the HC adsorbing/purifying catalyst be lowered more than that of cells of the first three-way catalyst 21. Hence, when the number of cells per unit area of the first three-way catalyst 21 is defined as Nt1, it is preferable that the numbers of cells satisfy the following equation:

$$Nt1 > N11 > N12 \geq N13 \geq \ldots \geq N1n$$

For example, it is preferable to use a monolithic carrier having cells of 900 cspi or more for the first three-way catalyst 21, and to use a monolithic carrier having cells of 100 to 600 cpsi for each HC adsorbing/purifying catalyst of the HC adsorbing/purifying catalyst group 10.

Note that, as shown in FIG. 3A, the exhaust gas purifying system according to this embodiment can be added with the second three-way catalyst 22 downstream of the HC adsorbing/purifying catalyst group 10. In this case also, similarly to the first three-way catalyst 21, the number of cells Nt2 per unit area of the second three-way catalyst 22 is increased more than the number of cells of each HC adsorbing/purifying catalyst of the HC adsorbing/purifying catalyst group 10. Specifically, it is preferable that the exhaust gas purifying system according to this embodiment satisfies the following equation:

$$Nt1 \geq Nt2 > N11 > N12 \geq N13 \geq \ldots \geq N1n$$

Moreover, as shown in FIG. 3C, the exhaust gas purifying system according to this embodiment can be further added with the third three-way catalyst 23 between any HC adsorbing/purifying catalysts of the HC adsorbing/purifying catalyst group 10. Such addition of the third three-way catalyst 23 suppresses a temperature increase of the HC adsorbing/purifying catalyst 13 located on the downstream side. Therefore, the desorption starting of the adsorbed HC can be delayed. Consequently, since the starting of HC desorption in the HC adsorbing/purifying catalyst on the downstream side can be matched with the timing of activation starting of the purifying catalyst layer 3, the HC purification rate can be improved.

Furthermore, in the HC adsorbing/purifying catalyst group 10 of the exhaust gas purifying system according to this embodiment, a heat capacity per unit volume of the HC adsorbing/purifying catalyst on the upstream side is increased more than a heat capacity per unit volume of the HC adsorbing/purifying catalyst on the downstream side, thus making it possible to suppress the temperature increase of the HC adsorbing/purifying catalyst on the downstream side. Accordingly, since the HC desorption rate of the HC adsorbing/purifying catalyst on the downstream side is suppressed, the desorption starting of HC adsorbed to the HC adsorbent layer 2 and the activation starting of the purifying catalyst layer 3 can be readily allowed to coincide with each other in timing. Thus, it is made possible to further improve the purification rate of HC.

Controlling a coated amount of the HC adsorbent layer 2 in each HC adsorbing/purifying catalyst can control the heat capacities. Concretely, the heat capacities can be controlled by increasing a coated amount of the HC adsorbing/purifying catalyst located upstream more than a coated amount of the HC adsorbing/purifying catalyst located downstream. In the HC adsorbing/purifying catalyst located upstream, the HC adsorbent layer 2 is thickened to enable the delay of the desorption starting of the adsorbed HC. In the HC adsorbing/ purifying catalyst located downstream, the temperature increase of the purifying catalyst layer 3 can accelerate the activation starting. Therefore, the HC purification rate in the entire system can be further improved.

Note that changing a material of the monolithic carrier can also control the heat capacities. Concretely, a material for the monolithic carrier of the HC adsorbing/purifying catalyst located upstream is set to have a heat capacity larger than that of a material for the monolithic carrier of the HC adsorbing/purifying catalyst located downstream. Thus, it is made possible to obtain an effect similar to the above.

Moreover, each HC adsorption/purifying catalyst has a Pd supported layer in the purifying catalyst layer 3. A depth position of a Pd supported layer of the HC adsorbing/purifying catalyst located downstream is set closer to the contact surface with exhaust gas or on the surface position in comparison with a depth position of a Pd supported layer of the HC adsorbing/purifying catalyst located upstream. Thus, the HC purification rate in the entire system can be further improved.

In the HC adsorbing/purifying catalyst on the downstream side, in which the temperature increase is slow, noble metal, particularly the Pd supported layer offering excellent low-temperature activity is disposed near the surface of the purifying catalyst layer 3, which can transfer the heat of exhaust gas most readily. Therefore, the temperature increase of the purifying catalyst layer 3 can be promoted to accelerate the activation starting. Thus, in the HC adsorbing/purifying catalyst on the downstream side, it is facilitated to match the timing of desorption staring of HC from the HC adsorbent layer 2 and the timing of activation of the purifying catalyst layer 3, thus making it possible to improve the HC purification rate.

Next, description will be made for components and the like of the above-described HC adsorbing/purifying catalyst.

In the case of using zeolite as a HC adsorbent of the HC adsorbent layer 2, adsorptivity thereof for the cold HC is affected by a correlation between HC species composition in the exhaust gas and a pore size of the zeolite. Accordingly, it is necessary to use zeolite having optimum pore size, distribution and a skeletal structure.

Although an MFI type is generally used, zeolite having another pore size (for example, USY) is singly used, or plural types of such zeolites are mixed, and thus a pore size distribution of zeolite is controlled. However, after a long-time use, because of differences in pore size distortion and adsorption/desorption characteristics depending on types of zeolites, adsorption of the HC species in the exhaust gas will be insufficient.

As a HC adsorbent used for the HC adsorbent layer 2, H type β-zeolite having a Si/2Al ratio set in a range of 10 to 1000 is available. Since this H type β-zeolite has a wide pore distribution and high resistance to heat, the H type β-zeolite is suitable from a viewpoint of improvements of the HC adsorption rate and heat resistance.

In addition, if one selected from MFI, a Y type zeolite, USY, mordenite and ferrierite or an optional mixture thereof is used as the HC adsorbent in combination with the foregoing H type β-zeolite, then the pore size distribution of the material can be expanded. Therefore, the HC adsorption rate of the HC adsorbent layer can be further improved.

For the HC adsorbent layer 2, besides the above zeolite-series materials, one selected from palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B) and zirconium (Zr) or a mixture thereof can be added. Since the adsorptivity and heat resistance of zeolite can be accordingly enhanced more, it is possible to delay the desorption of the adsorbed HC.

In addition, the HC adsorbent layer 2 may contains the above-described zeolite as a main component, and further contains one selected from Pt, Rh and Pd or a mixture thereof, zirconium oxide containing 1 to 40 mol %, in metal, of one selected from Ce, Nd, praseodymium (Pr) and La or a mixture thereof, and alumina. Accordingly, since the purifying catalyst components are added to the HC adsorbent layer 2, it is possible to improve the purification rate of the upper purifying catalyst layer 3.

For the above-described alumina, it is preferable to add cerium having a crystallite size of 10 nm (100 Å) or less. Such cerium having a crystallite size of 10 nm or less has extremely high dispersability, thus enabling the heat resistance of alumina to be increased. Moreover, since sintering of the supported noble metal is suppressed, the heat resistance of the HC adsorbent layer 2 can be further increased.

Meanwhile, for the purifying catalyst component contained in the HC adsorbent layer 2, noble metal selected from Pt, Rh and Pd or a mixture thereof can be used. Furthermore, it is possible to add alumina containing 1 to 10 mol %, in metal, of one selected from Ce, Zr and La or a mixture thereof, and cerium oxide containing 1 to 50 mol %, in metal, of one selected from Zr, Nd, Pr and La or a mixture thereof.

The three-way catalyst of the foregoing purifying catalyst layer 3 effectively functions in a stoichiometric air-fuel ratio (Air/Fuel=14.6), oxidizes HC and CO, and reduces NOx. However, since atmosphere of the purifying catalyst layer 3 becomes short of oxygen when HC desorbed from the HC adsorbent layer 2 is purified, well-balanced purification is impossible for HC, carbon monoxide (CO) and nitrogen oxides (NOx). Consequently, the adsorbed HC cannot be sufficiently purified. On the other hand, when cerium oxide is added to the purifying catalyst layer 3, since the cerium oxide discharges oxygen in desorption of the adsorbed HC, the HC purification rate of the purifying catalyst layer 3 can be improved.

In this case, for the above-described cerium oxide, the one represented by the following composition formula can be used:

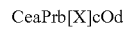

Here, X indicates at least one element selected from the group consisting of zirconium, lanthanum and neodymium, a, b and c change in accordance with valences of the respective elements so as to satisfy d=2.0, and when d=2.0, a=0.5 to 0.99, b=0.05 to 0.5, c=0.0 to 0.4, and a+b+c=1. Accordingly, since a temperature at which the cerium oxide discharges oxygen can be further dropped, the HC purification rate of the purifying catalyst layer 3 is further improved.

In addition, zirconium oxide containing 1 to 40 mol %, in metal, of any of Ce and La or a mixture thereof can be added to the purifying catalyst layer 3. Accordingly, the HC purification rate of the purifying catalyst layer 3 can be further improved.

Meanwhile, if the purifying catalyst layer 3 contains noble metal such as Pt, Rh and Pd, and alkaline metal and/or alkaline earth metal, the heat resistance thereof is improved. Accordingly, the HC purification rate can be improved.

Moreover, no particular limitations are imposed on materials for the above-described monolithic carrier, and conventionally known materials can be used. Concretely, cordierite, metal and silicon carbide can be used.

Note that, for materials having relatively small heat capacities, porous cordierite, metal and the like are available. For materials having relatively large heat capacities, dense cordierite, silicon carbide and the like are available. In the exhaust gas purifying system according to this embodiment, for the HC adsorbing/purifying catalyst located upstream, a monolithic carrier formed of dense cordierite or silicon carbide can be used. For the HC adsorbing/purifying catalyst located downstream, a monolithic carrier formed of porous cordierite or metal can be used.

Meanwhile, for components used for the first to third three-way catalysts 21 to 23, fire-resistant inorganic oxides such as platinum, palladium, rhodium and alumina, which exert the three-way catalyst function, or the like can be used.

Note that the three-way catalysts can use a variety of monolithic carriers similarly to the HC adsorbing/purifying catalysts.

EXAMPLES

Catalyst 1: HC Adsorbing/Purifying Catalyst (Preparation of "Catalyst-a")

2125 g of β-zeolite powder (H type, Si/2Al=25), 1875 g of silica sol (solid part 20%) and 3000 g of pure water were poured into a magnetic ball mill, then were mixed and milled, and thus a slurry solution was obtained. This slurry solution was coated on a monolithic carrier (200 cells/10 mills, catalyst capacity 1.0 L), dried after removing extra slurry in the cells by an air flow, and fired at 400° C. for an hour. After the baking, the coating step was repeated until an amount of coating reached 250 g/L, and thus a "catalyst-a" was obtained.

(Preparation of "Catalyst-b")

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was fired at 400° C. for an hour, and then at 600° C. for an hour, and thus Pd supported alumina powder ("powder a") was obtained. Pd concentration of this "powder a" was 4.0 weight %.

Cerium oxide powder (Ce 67 mol %) containing 1 mol % of La and 32 mol % of Zr was impregnated with the palladium nitrate aqueous solution, or sprayed therewith while the cerium oxide powder was stirred at a high speed. After the cerium oxide powder was dried at 150° C. for 24 hours, the dried cerium oxide powder was fired at 400° C. for an hour, and then at 600° C. for an hour, and thus Pd supported cerium oxide powder ("powder b") was obtained. Pd concentration of this "powder b" was 2.0 weight %.

314 g of the foregoing Pd supported alumina powder ("powder a"), 314 g of the Pd supported cerium oxide powder ("powder b"), 320 g of nitric acid alumina sol (32 g, in $Al_2O_3$, of sol obtained by adding 10 weight % of nitric acid to 10 weight % of boehmite alumina), 51.5 g of barium carbonate (40 g of BaO) and 2000 g of pure water were poured into a magnetic ball mill, then were mixed and milled, and thus a slurry solution was obtained. This slurry solution was coated on the foregoing "catalyst-a", dried after removing extra slurry in the cells by an air flow, and fired at 400° C. for an hour. Thus, a "catalyst-b" of a coated layer weight of 70 g/L was obtained.

(Preparation of HC Adsorbing/Purifying Catalyst)

Alumina powder (Al 97 mol %) containing 3 mol % of Zr was impregnated with a rhodium nitrate aqueous solution, or sprayed therewith while the alumina powder was stirred at a high speed. After the alumina powder was dried at 150° C. for 24 hours, the alumina powder was fired at 400° C. for an hour, and then at 600° C. for an hour, and thus Rh supported alumina powder ("powder c") was obtained. Rh concentration of this "powder c" was 2.0 weight %.

Alumina powder (Al 97 mol %) containing 3 mol % of Ce was impregnated with a dinitro diammine platinum aqueous solution, or sprayed therewith while the alumina powder was stirred at a high speed. After the alumina powder was dried at 150° C. for 24 hours, the alumina powder was fired at 400° C. for an hour, and then at 600° C. for an hour, and thus Pt supported alumina powder ("powder d") was obtained. Pt concentration of this "powder d" was 4.0 weight %.

118 g of the foregoing Rh supported alumina powder ("powder c"), 177 g of the Pt supported alumina powder ("powder d"), 175 g of zirconium oxide powder containing 1 mol % of La and 20 mol % of Ce and 300 g of nitric acid alumina sol were poured into a magnetic ball mill, then were mixed and milled, and thus a slurry solution was obtained. This slurry solution was coated on the foregoing "catalyst-b", dried after removing extra slurry in the cells by an air flow, and fired at 400° C. for an hour. Thus, a "catalyst 1" of this example was obtained, in which a coated layer weight is 50 g/L.

Noble metal supported amounts of the HC adsorbing/purifying catalyst ("catalyst 1") thus obtained were 0.71 g/L for Pt, 1.88 g/L for Pd, and 0.24 g/L for Rh. Tables 1 and 2 show specifications of the "catalyst 1".

Catalyst 13: HC Adsorbing/Purifying Catalyst (Preparation of "Catalyst-c")

2125 g of β-zeolite powder (H type, Si/2Al=40), 1875 g of silica sol (solid part 20%) and 3000 g of pure water were poured into a magnetic ball mill, then were mixed and milled, and thus a slurry solution was obtained. This slurry solution was coated on a monolithic carrier (300 cells/6 mills, catalyst volume: 0.5 L), dried after removing extra slurry in the cells by an air flow, and fired at 400° C. for an hour. After the firing, the coating step was repeated until an amount of coating reached 250 g/L, and thus a "catalyst-c" was obtained.

(Preparation of "Catalyst-d")

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was fired at 400° C. for an hour, and then at 600° C. for an hour, and thus Pd supported alumina powder ("powder e") was obtained. Pd concentration of this "powder e" was 2.0 weight %.

Cerium oxide powder (Ce 67 mol %) containing 1 mol % of La and 32 mol % of Zr was impregnated with the palladium nitrate aqueous solution, or sprayed therewith while the cerium oxide powder was stirred at a high speed. After the cerium oxide powder was dried at 150° C. for 24 hours, the dried cerium oxide powder was fired at 400° C. for an hour, and then at 600° C. for an hour, and thus Pd supported cerium oxide powder ("powder f") was obtained. Pd concentration of this "powder f" was 1.0 weight %.

314 g of the foregoing Pd supported alumina powder ("powder e"), 314 g of the Pd supported cerium oxide powder ("powder f"), 320 g of nitric acid alumina sol (32 g, in $Al_2O_3$, of sol obtained by adding 10 weight % of nitric acid to 10 weight % of boehmite alumina), 51.5 g of barium carbonate (40 g of BaO) and 2000 g of pure water were poured into a magnetic ball mill, then were mixed and milled, and thus a slurry solution was obtained. This slurry solution was coated on the foregoing "catalyst-c", dried after removing extra slurry in the cells by an air flow, and fired at 400° C. for an hour. Thus, a "catalyst-d" of a coated layer weight of 70 g/L was obtained.

(Preparation of HC Adsorbing/Purifying Catalyst)

Alumina powder (Al 97 mol %) containing 3 mol % of Zr was impregnated with a rhodium nitrate aqueous solution, or sprayed therewith while the alumina powder was stirred at a high speed. After the alumina powder was dried at 150° C. for 24 hours, the dried alumina powder was fired at 400° C. for an hour, and then at 600° C. for an hour, and thus Rh supported alumina powder ("powder g") was obtained. Rh concentration of this "powder g" was 1.0 weight %.

Alumina powder (Al 97 mol %) containing 3 mol % of Ce was impregnated with a dinitro diammine platinum aqueous solution, or sprayed therewith while the alumina powder was stirred at a high speed. After the alumina powder was dried at 150° C. for 24 hours, the dried alumina powder was fired at 400° C. for an hour, and then at 600° C. for an hour, and thus Pt supported alumina powder ("powder h") was obtained. Pt concentration of this "powder h" was 2.0 weight %.

118 g of the foregoing Rh supported alumina powder ("powder g"), 177 g of the Pt supported alumina powder ("powder h"), 175 g of zirconium oxide powder containing 1 mol % of La and 20 mol % of Ce, and 300 g of nitric acid alumina sol were poured into a magnetic ball mill, then were mixed and milled, and thus a slurry solution was obtained. This slurry solution was coated on the foregoing "catalyst-d", dried after removing extra slurry in the cells by an air flow, and fired at 400° C. for an hour. Thus, a "catalyst 13" of this example was obtained, in which a coated layer weight is 50 g/L.

Noble metal supported amounts of the catalyst thus obtained were 0.36 g/L for Pt, 0.94 g/L for Pd, and 0.12 g/L for Rh. Tables 1 and 2 show specifications of the "catalyst 13".

Catalyst 41: Three-Way Catalyst (Preparation of "Catalyst-e")

432 g of the foregoing Pd supported alumina powder ("powder a"), 314 g of the Pd supported cerium oxide powder ("powder b"), 140 g of nitric acid alumina sol (32 g, in $Al_2O_3$, of sol obtained by adding 10 weight % of nitric acid to 10 weight % of boehmite alumina), 51.5 g of barium carbonate (40 g of BaO) and 2000 g of pure water were poured into a magnetic ball mill, then were mixed and milled, and thus a slurry solution was obtained. This slurry solution was coated on a monolithic carrier (1200 cells/2 mills, catalyst capacity 0.5 L), dried after removing extra slurry in the cells by an air flow, and fired at 400° C. for an hour. Thus, a "catalyst-e" of a coated layer weight of 80 g/L was obtained.

(Preparation of Three-Way Catalyst)

118 g of the foregoing Rh supported alumina powder ("powder c"), 177 g of the Pt supported alumina powder ("powder h"), 175 g of zirconium oxide powder containing 1 mol % of La, and 20 mol % of Ce, and 300 g of nitric acid alumina sol were poured into a magnetic ball mill, then were mixed and milled, and thus a slurry solution was obtained. This slurry solution was coated on the foregoing "catalyst-e", dried after removing extra slurry in the cells by an air flow, and fired at 400° C. for an hour. Thus, a "catalyst 41" of this example was obtained, in which a coated layer weight is 50 g/L.

Noble metal supported amounts of the catalyst thus obtained were 0.71 g/L for Pt, 2.36 g/L for Pd and 0.24 g/L for Rh. Tables 1 and 2 show specifications of the catalyst 41.

Catalyst 42: HC Adsorbing/Purifying Catalyst (Preparation of "Catalyst-a2")

First, the "catalyst-a" was prepared by a method similar to that for the "catalyst 1".

118 g of the foregoing Rh supported alumina powder ("powder c"), 177 g of the Pt supported alumina powder ("powder d"), 175 g of zirconium oxide powder containing 1 mol % of La and 20 mol % of Ce and 300 g of nitric acid alumina sol were poured into a magnetic ball mill, then were mixed and milled, and thus a slurry solution was obtained. This slurry solution was coated on the foregoing "catalyst-a", dried after removing extra slurry in the cells by an air flow, and fired at 400° C. for an hour. Thus, a "catalyst-a2" of a coated layer weight of 50 g/L was obtained. Noble metal supported amounts of the catalyst thus obtained were 0.71 g/L for Pt and 0.24 g/L for Rh.

(Preparation of HC Adsorbing/Purifying Catalyst)

314 g of the foregoing Pd supported alumina powder ("powder a"), 314 g of the foregoing Pd supported cerium oxide powder ("powder b"), 320 g of nitric acid alumina sol (32 g, in $Al_2O_3$, of sol obtained by adding 10 weight % of nitric acid to 10 weight % of boehmite alumina), 51.5 g of barium carbonate (40 g of BaO) and 2000 g of pure water were poured into a magnetic ball mill, then were mixed and milled, and thus a slurry solution was obtained. This slurry solution was coated on the foregoing "catalyst-a2", dried after removing extra slurry in the cells by an air flow, and fired at 400° C. for an hour. Thus, a "catalyst 42" of a coated layer weight of 70 g/L was obtained.

Noble metal supported amounts of the "catalyst 42" thus obtained were 0.71 g/L for Pt, 1.88 g/L for Pd and 0.24 g/L for Rh.

Catalysts 2 to 39: HC Adsorbing/Purifying Catalysts

Catalysts 2 to 39 were prepared in a procedure similar to that for the catalysts 1 and 2. Detailed conditions are shown in Table 1 of FIG. 5 and Table 2 of FIG. 6.

In addition, for the catalyst 12, a dense cordierite material having a specific heat ranging from 1.1 to 1.2 (J/g~K) was used as a monolithic carrier instead of a normal cordierite material having a specific heat of 1.0 (J/g~K). Thus, the heat capacity of the catalyst 12 was increased.

Figures 7A, 7B:
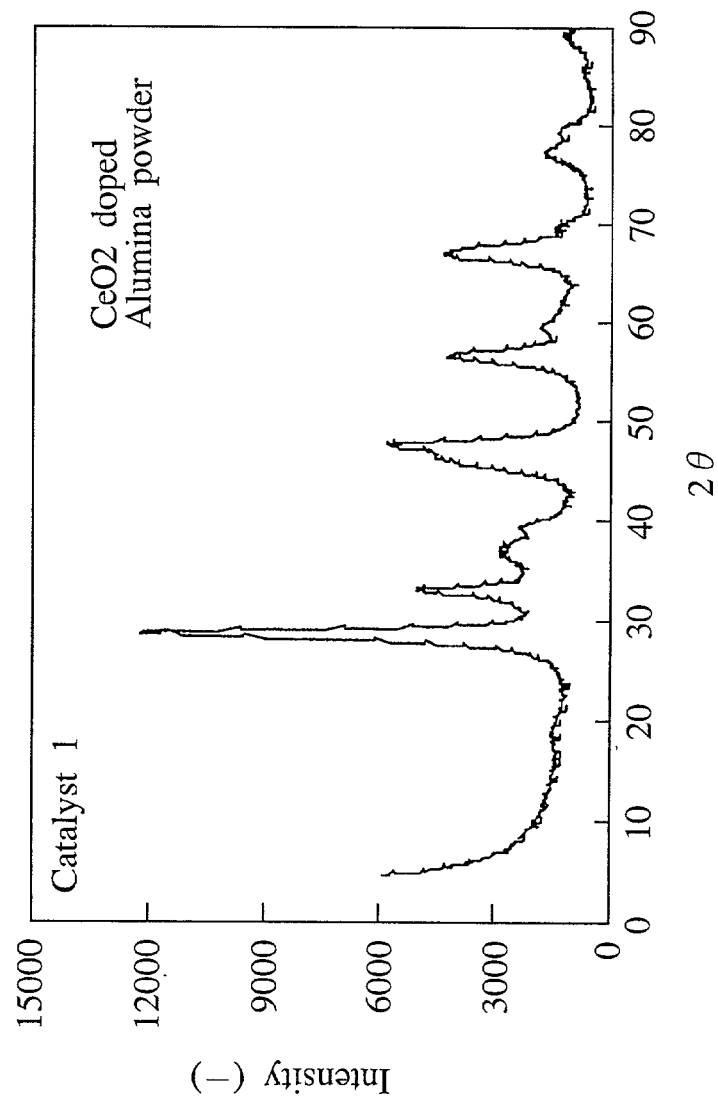
FIGS. 7A and 7B are a graph of an X-ray diffraction pattern of $CeO_2$-doped alumina powder used in a catalyst 1 according to an example, and a table of diffraction angles and relative strengths in respective Miller indices obtained from the pattern, respectively.

For the catalyst 1, an alumina material added with $CeO_2$ having a crystallite size of about 8.0 nm was used. FIG. 7A shows an X-ray diffraction pattern of the alumina material used for the catalyst 1. Also for the catalysts 2, 5 to 18, 20 to 27, 31, 32, 34 and 36 to 39, the same alumina material was used.

Figures 8A, 8B:
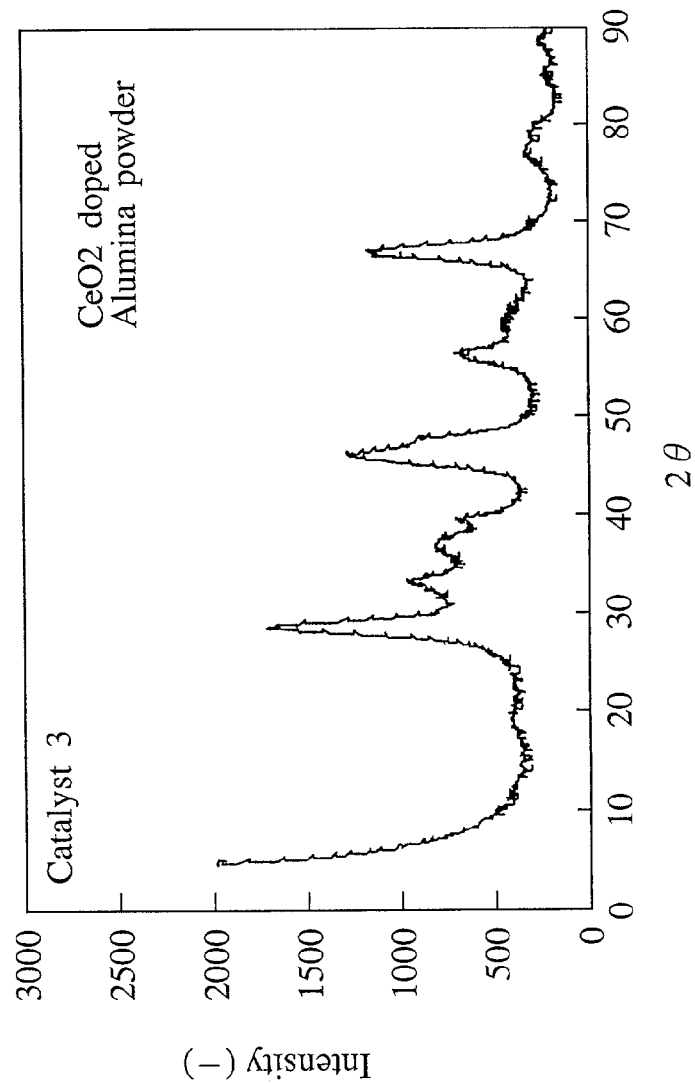
FIGS. 8A and 8B are a graph of an X-ray diffraction pattern of $CeO_2$-doped alumina powder used in a catalyst 3 according to an example, and a table of diffraction angles and relative strengths in respective Miller indices obtained from the pattern, respectively.

For the catalyst 3, an alumina material added with $CeO_2$ having a crystallite size of about 5.0 nm was used. FIG. 8A shows an X-ray diffraction pattern of the alumina material used for the catalyst 3. Also for the catalysts 4 and 28 to 30, the same alumina material was used.

Figures 9A, 9B:
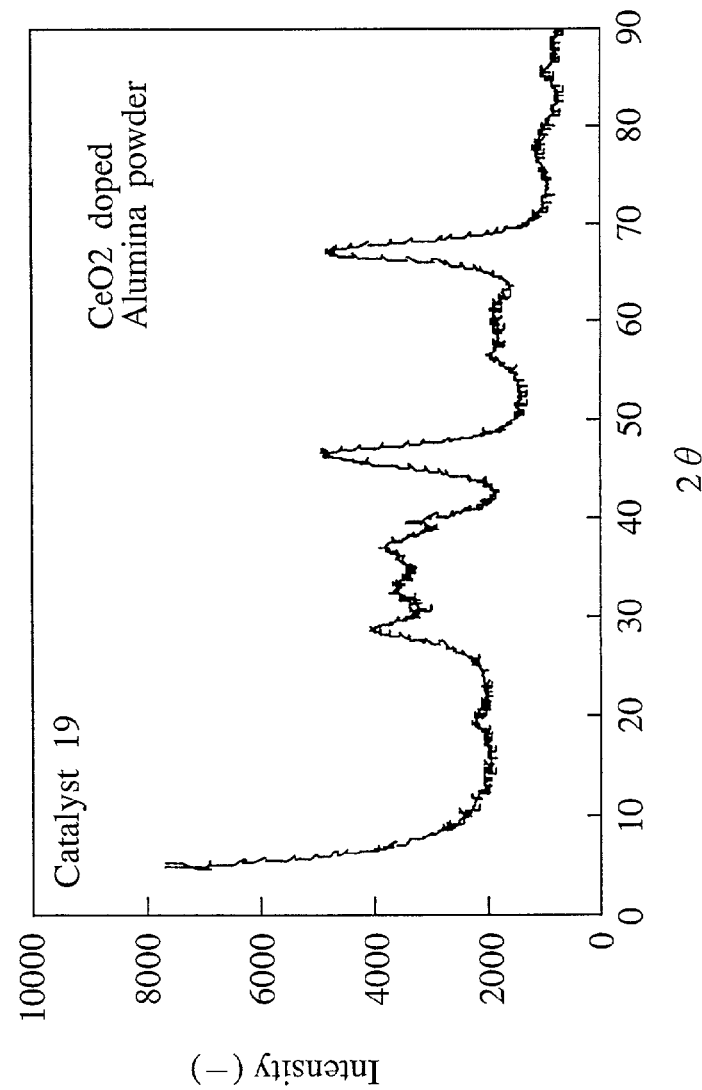
FIGS. 9A and 9B are a graph of an X-ray diffraction pattern of $CeO_2$-doped alumina powder used in a catalyst 19 according to an example, and a table of diffraction angles and relative strengths in respective Miller indices obtained from the pattern, respectively.

For the catalyst 19, an alumina material added with $CeO_2$ having a crystallite size of about 4.7 nm was used. FIG. 9A shows an X-ray diffraction pattern of the alumina material used for the catalyst 19. Also for the catalyst 33, the same alumina material was used.

For the catalyst 35, the one obtained by subjecting an alumina material added with $CeO_2$ to heat treatment at 1000° C. for 12 hours and allowing a crystallite size thereof to be about 150 nm was used.

Catalyst 40: Three-Way Catalyst

A catalyst 40 was prepared in a procedure similar to that for the catalyst 41. Detailed conditions are shown in Table 1 of FIG. 5 and in Table 2 of FIG. 6.

[Measurement of Cerium Crystallite Size]

The crystallite sizes of the cerium contained in the alumina used for the respective catalysts were measured by the following method under the following conditions, and the obtained results were put together with the specifications in Table 2. Note that, with regard to the catalysts 1, 3 and 19, X-ray diffraction charts and X-ray diffraction data are shown in FIGS. 7A to 9B, respectively.

(Sample Preparation Method for XRD Measurement)
1. A powder sample is milled by use of an agate mortar so that each particle size can be several 100 μm or less.
2. The milled sample is crammed into a grove of a glass sample plate for XRD measurement (depth 0.5 mm), and a measured surface is made flat.

(X-Ray Diffraction Measurement Condition)
Apparatus: Wide-angle X-ray diffraction apparatus (MXP-VAHF) made by MAC Science Co., Ltd.
X-ray source: CuKα, Wavelength: 1.54056 Å, Tube current: 300 mA, Tube voltage: 40
kV, Data measurement range: 2θ=5 to 90 deg., Scan width: 2θ/θ
Scan speed: 4 deg./min., Sampling interval: 0.02 deg.
Divergence slit: 1.0 deg., Scattering slit: 1.0 deg.
Emission slit: 0.3 mm (Calculation Condition of Crystallite Size)

The crystallite sizes were calculated by use of the following equation (Sherrer's formula).

$$\text{crystallite size} = K\lambda/(\Delta(2\theta)^* \cos\theta)$$

where $K=0.9$, $\lambda=1.54$Å, $\Delta(2\theta)=0.0174533*$half band width

θ was obtained by dividing, by 2, a diffraction angle (2θ) in each of the Miller indices (111), (200), (220), (311), (222), (331) and (420). Δ(2θ) was calculated by multiplying a half band width of each X-ray diffraction peak by 0.0174533. The one obtained by averaging values calculated based on the half band widths of the X-ray diffraction peaks was defined as a crystallite size.

EXAMPLES 1 to 34 and 60 to 64

By use of the variety of catalysts described above, exhaust gas purifying systems of the examples were constructed, which were configured as shown in FIG. 10A. Table 3 of FIG. 11 shows conditions of the examples 1 to 34 and 60 to 64.

EXAMPLES 35 to 40

By use of the variety of catalysts described above, exhaust gas purifying systems of the examples were constructed, which were configured as shown in FIG. 10B. Table 4 of FIG. 12 shows conditions of the examples 35 to 40.

EXAMPLES 41 and 42

Figure 10C:
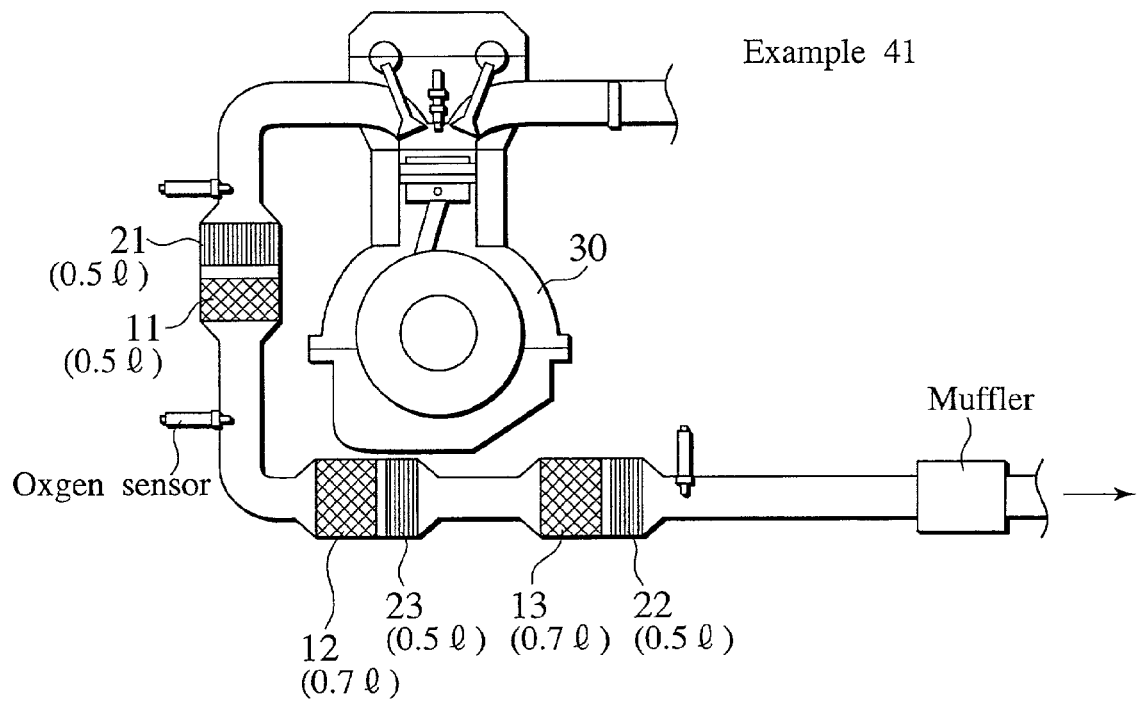
Figure 10D:
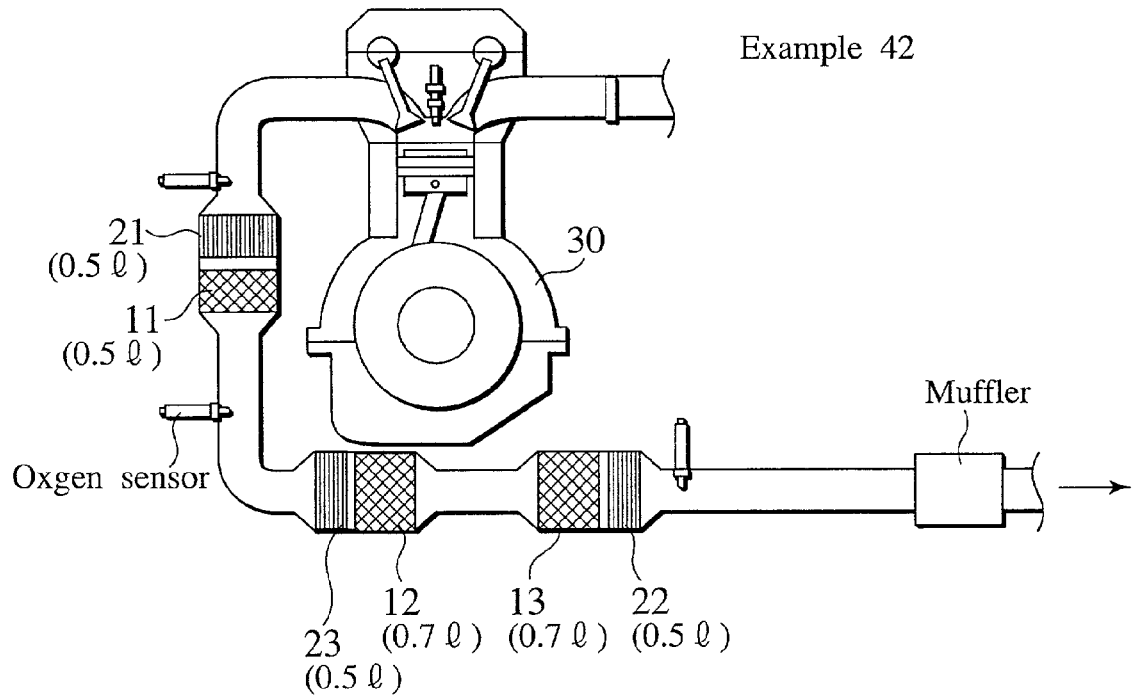

By use of the variety of catalysts described above, exhaust gas purifying systems of the examples were constructed, which were configured as shown in FIGS. 10C and 10D. Table 5 of FIG. 13 shows conditions of the examples 41 and 42.

EXAMPLES 43 to 45

Figure 10E:
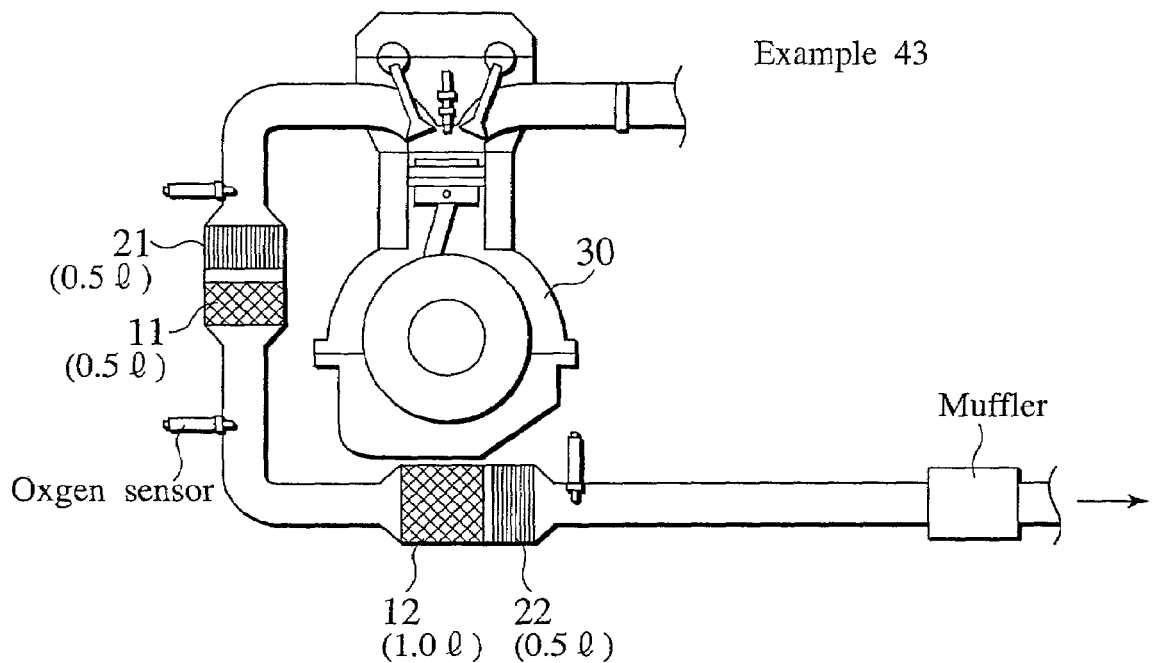
Figure 10F:
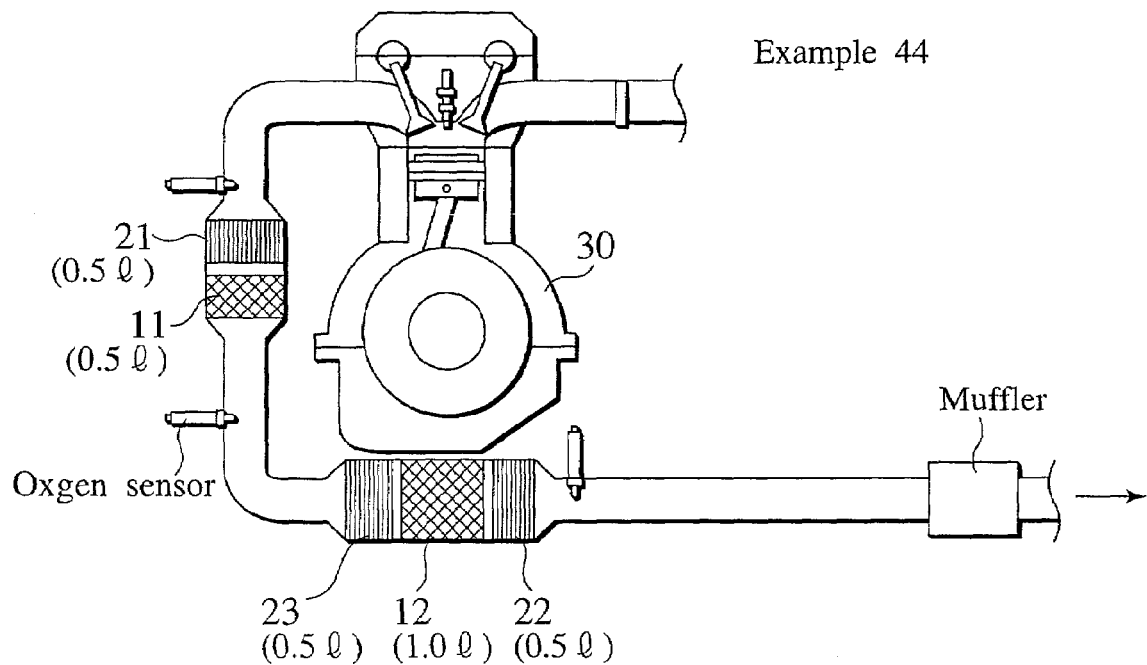
Figure 10G:
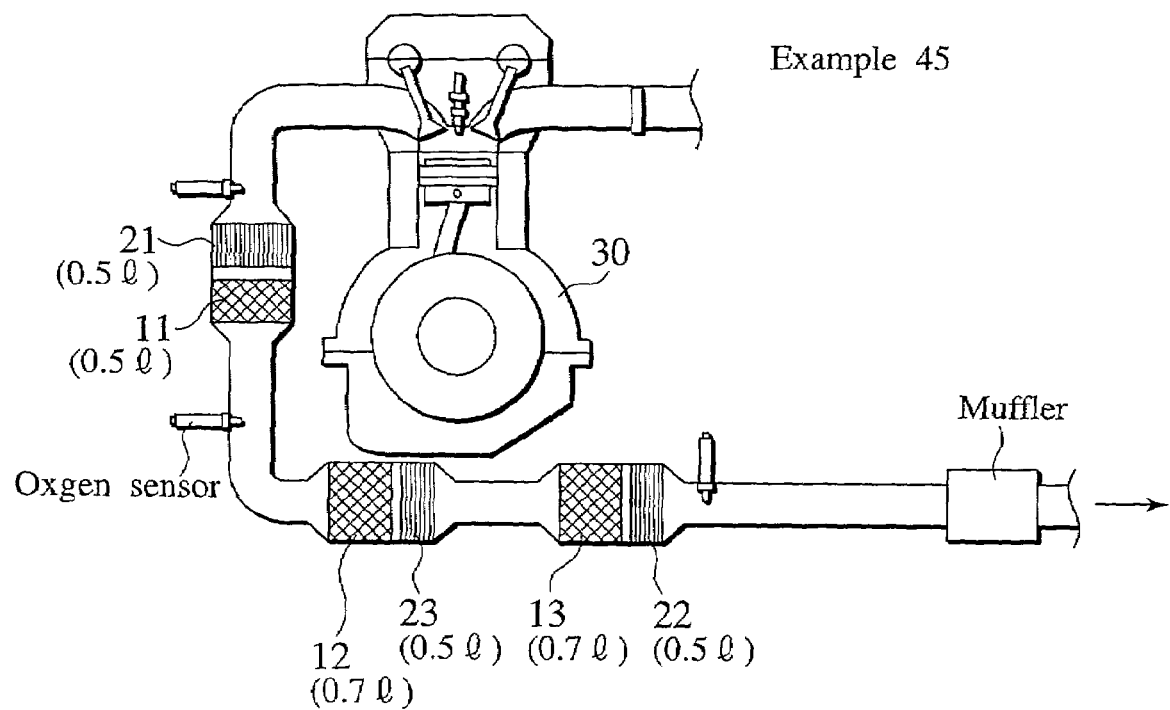

By use of the variety of catalysts described above, exhaust gas purifying systems of the examples were constructed, which were configured as shown in FIGS. 10E to 10G. Table 5 of FIG. 13 shows conditions of the examples 43 to 50.

EXAMPLES 46 to 60

By use of the variety of catalysts described above, exhaust gas purifying systems of the examples were constructed, which were configured as shown in FIG. 11A. Table 8 of FIG. 14 shows conditions of the examples 46 to 60.

[Performance Evaluation]

Performance evaluation was carried out for the exhaust gas purifying systems of the respective examples under the following conditions by the following method. The obtained results were put in Tables 3 to 5 together with the specifications.

(Durability Condition)

| Engine displacement | 3000 cc |
|---|---|
| Fuel | gasoline (Nisseki Dash) |
| Catalyst inlet gas temperature | 650° C. |
| Time of durability | 100 hours |

(Vehicle Performance Test)

| Engine displacement | In-line four-cylinder 2.0 L engine by Nissan Motor Co., Ltd. |
|---|---|
| Method of evaluation | A-bag of LA4-CH of North America exhaust gas testing method |

From the results shown in Tables 3 to 5, the examples 33 and 40 can be said to be excellent in terms of the cold HC adsorption rate and the desorption/purification rate of the adsorbed HC.

As described above, in the exhaust gas purifying system provided with the plurality of HC adsorbing/purifying catalysts, the present invention improves the purification rate of the cold HC by controlling the number of cells per unit sectional area of the monolithic carrier of each HC adsorbing/purifying catalyst.

The entire contents of Japanese Patent Applications P2001-183288 (filed: Jun. 18, 2001) and P2002-143193 (filed: May 17, 2002) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. An exhaust gas purifying system for a vehicle, comprising:
    a) an exhaust gas passage;
    b) a first three-way catalyst disposed on the exhaust gas passage to form a first three-way catalytic converter; and
    c) a plurality of HC adsorbing/purifying catalysts disposed in series downstream of the first three-way catalyst on the exhaust gas passage, the plurality of HC adsorbing/purifying catalysts including a first HC adsorbing/purifying catalyst disposed downstream of the first three-way catalyst to form a first HC catalytic converter and a second HC adsorbing/purifying catalyst disposed downstream of the first HC adsorbing/purifying catalyst to be distant therefrom to form a second HC catalytic converter, wherein the first three-way catalyst comprises a monolithic carrier having a plurality of cells, wherein each of the HC adsorbing/purifying catalysts comprises:
a monolithic carrier having a plurality of cells;
a HC adsorbent layer on the monolithic carrier; and
a purifying catalyst layer on the HC adsorbent layer, wherein a number of cells per unit area of the first HC adsorbing/purifying catalyst is larger than a number of cells per unit area of the second HC adsorbing/purifying catalyst, and a number of cells per unit area of the first three-way catalyst is larger than the number of cells per unit area of the first HC adsorbing/purifying catalyst and the second HC adsorbing/purifying catalyst, and wherein a heat capacity per unit volume of the first HC adsorbing/purifying catalyst is larger than a heat capacity per unit volume of the second HC adsorbing/purifying catalyst.

2. The exhaust gas purifying system according to claim 1, wherein the number of cells per unit area of the first HC adsorbing/purifying catalyst is 1.5 to 3 times the number of cells per unit area of the second HC adsorbing/purifying catalyst.

3. The exhaust gas purifying system according to claim 1, wherein an adsorption capacity of the first HC adsorbing/purifying catalyst is larger than that of the second HC adsorbing/purifying catalyst.

4. The exhaust gas purifying system according to claim 1, wherein an amount of a HC adsorbent contained in the first HC adsorbing/purifying catalyst is larger than an amount of a HC adsorbent contained in the second HC adsorbing/purifying catalyst.

5. The exhaust gas purifying system according to claim 1, further comprising:
a second three-way catalyst disposed downstream of the plurality of HC adsorbing/purifying catalysts on the exhaust gas passage,
wherein the second three-way catalyst comprises a monolithic carrier having a plurality of cells, and a number of the cells thereof per unit area is smaller than or equal to the number of the cells per unit area of the first three-way catalyst and larger than a number of cells per unit area of the first HC adsorbing/purifying catalyst.

6. The exhaust gas purifying system according to claim 5, further comprising:
a third three-way catalyst disposed between the plurality of HC adsorbing/purifying catalysts on the exhaust gas passage.

7. The exhaust gas purifying system according to claim 1, wherein coated amounts of an HC adsorbent of the first HC adsorbing/purifying catalyst are larger than coated amounts of an HC adsorbent of the second HC adsorbing/purifying catalyst.

8. The exhaust gas purifying system according to claim 1, wherein a heat capacity of the monolithic carrier of the first HC adsorbing/purifying catalyst is larger than a heat capacity of the monolithic carrier of the second HC adsorbing/purifying catalyst.

9. The exhaust gas purifying system according to claim 1, wherein each of the HC adsorbing/purifying catalysts comprises a Pd supported layer in the purifying catalyst layer, and
a position of a Pd supported layer in a thickness direction of the second HC adsorbing/purifying catalyst is closer to a contact surface with exhaust gas in comparison with a position of a Pd supported layer in a thickness direction of the first HC adsorbing/purifying catalyst.

10. The exhaust gas purifying system according to claim 1, wherein the first three-way catalyst restricts an amount of HC to be adsorbed to each of the HC adsorbing/purifying catalysts so as to be less than an amount of saturated HC adsorption thereof.

11. The exhaust gas purifying system according to claim 1, wherein the first three-way catalyst restricts an amount of HC to be adsorbed to each of the HC adsorbing/purifying catalysts so as to be smaller than or equal to 70% of an amount of saturated HC adsorption thereof.

12. The exhaust gas purifying system according to claim 1, wherein
the HC adsorbent layer comprises an H type β-zeolite having a Si/2Al ratio set in a range of 10 to 1000.

13. The exhaust gas purifying system according to claim 1, wherein
the HC adsorbent layer comprises at least one type of zeolite selected from the group consisting of MFI, Y type zeolite, USY, mordenite and ferrierite.

14. The exhaust gas purifying system according to claim 1, wherein
the HC adsorbent layer comprises at least one type selected from the group consisting of palladium, magnesium, calcium, strontium, barium, silver, yttrium, lanthanum, cerium, neodymium, phosphorus, boron and zirconium.

15. The exhaust gas purifying system according to claim 1, wherein
the HC adsorbent layer comprises:
zeolite as a main component;
at least one type of noble metal selected from the group consisting of platinum, rhodium and palladium;
zirconium oxide containing 1 to 40 mol % of at least one type selected from the group consisting of cerium, neodymium, praseodymium and lanthanum, in terms of metal atoms; and
alumina containing 1 to 10 mol % of at least one type selected from the group consisting of cerium, zirconium and lanthanum, in terms of metal atoms.

16. The exhaust gas purifying system according to claim 15, wherein
the alumina is further added with cerium having a crystallite size of 5 nm or less.

17. The exhaust gas purifying system according to claim 1, wherein
the purifying catalyst layer comprises:
at least one type of noble metal selected from the group consisting of palladium, platinum and rhodium;
alumina containing 1 to 10 mol % of at least one type selected from the group consisting of cerium, zirconium and lanthanum, in terms of metal atoms; and
cerium oxide containing 1 to 50 mol % of at least one type selected from the group consisting of zirconium, neodymium, praseodymium and lanthanum, in terms of metal atoms.

18. The exhaust gas purifying system according to claim 17,
wherein the cerium oxide contained in the purifying catalyst layer, in terms of metal atoms, is represented by the following composition formula:

$Ce_a Pr_b [X]_c O_d$ (where X indicates at least one element selected from the group consisting of zirconium, lanthanum and neodymium, a, b and c change in accordance with valences of the respective elements to satisfy d=2.0, and when d=2.0, a=0.5 to 0.99, b=0.05 to 0.5, c=0.0 to 0.4, and a+b+c=1).

19. The exhaust gas purifying system according to claim 18,
wherein the purifying catalyst layer further comprises zirconium oxide containing 1 to 40 mol % of one selected from cerium and lanthanum, in terms of metal atoms.

20. The exhaust gas purifying system according to claim 1,
wherein the purifying catalyst layer comprises:
at least one type of noble metal selected from the group consisting of palladium, platinum and rhodium; and
alkaline metal and/or alkaline earth metal.

* * * * *